United States Patent
Karnati et al.

(10) Patent No.: US 11,756,042 B2
(45) Date of Patent: Sep. 12, 2023

(54) AUTOMATIC DELIVERY OF CUSTOMER ASSISTANCE AT PHYSICAL LOCATIONS

(71) Applicant: Google LLC, Mountain View, CA (US)

(72) Inventors: Sriram Bhargav Karnati, Milpitas, CA (US); Varun Soundararajan, Sunnyvale, CA (US); Amit Agarwal, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 1107 days.

(21) Appl. No.: 16/459,031

(22) Filed: Jul. 1, 2019

(65) Prior Publication Data

US 2019/0325444 A1    Oct. 24, 2019

Related U.S. Application Data

(63) Continuation of application No. 14/989,559, filed on Jan. 6, 2016, now Pat. No. 10,380,595.

(51) Int. Cl.
*G06Q 20/40*  (2012.01)
*G06Q 20/32*  (2012.01)
(Continued)

(52) U.S. Cl.
CPC ....... *G06Q 20/405* (2013.01); *G06Q 20/3224* (2013.01); *G06Q 20/3226* (2013.01); *G06Q 30/0251* (2013.01); *G06Q 30/0281* (2013.01)

(58) Field of Classification Search
CPC ............ G06Q 20/405; G06Q 20/3224; G06Q 20/3226; G06Q 30/0281
See application file for complete search history.

(56) References Cited

U.S. PATENT DOCUMENTS 8,650,075 B2 * 2/2014 Fano ................. G06Q 30/0207
                                                              705/14.1
8,949,377 B2   2/2015 Makar et al.
(Continued)

FOREIGN PATENT DOCUMENTS

CN    103136679    6/2013
CN    103514558    1/2014
(Continued)

OTHER PUBLICATIONS

China Patent Office; Notification of First Office Action issued in Application No. 201680078277.3; 16 pages dated Feb. 23, 2021.
(Continued)

*Primary Examiner* — Jessica Lemieux
(74) *Attorney, Agent, or Firm* — Gray Ice Higdon

(57) ABSTRACT

A system is described that identifies, based on contextual information associated with a device that is located at a physical location associated with a merchant, a product that a user of the device is at the physical location to purchase. The system executes an autonomous search query for product information that is predicted to assist the user in completing a purchase of the product, from the merchant, at the physical location. The system sends the product information to the device, and for subsequent output. The system determines whether a degree of likelihood that the user will complete the purchase in response to receiving the product information satisfies a likelihood threshold, if not, the system executes a remote assistance module accessed by the device to provide a virtual environment in which a human provides additional information that the user needs to complete the purchase.

14 Claims, 8 Drawing Sheets

(51) Int. Cl.
*G06Q 30/02* (2023.01)
*G06Q 30/0251* (2023.01)

(56) References Cited

U.S. PATENT DOCUMENTS

| | | | |
|---|---|---|---|
| 9,087,332 B2 | 7/2015 | Bagherjeiran et al. | |
| 10,140,641 B2* | 11/2018 | Smith | G06Q 30/0639 |
| 2010/0070338 A1* | 3/2010 | Siotia | G06Q 10/087 |
| | | | 705/28 |
| 2013/0215116 A1 | 8/2013 | Siddique et al. | |
| 2014/0052681 A1 | 2/2014 | Nitz et al. | |
| 2014/0309935 A1 | 10/2014 | Ricci | |
| 2015/0026092 A1* | 1/2015 | Abboud | G06Q 30/0281 |
| | | | 705/346 |
| 2017/0091816 A1 | 3/2017 | Moreau et al. | |
| 2017/0116195 A1* | 4/2017 | Ratiu | H04L 51/52 |
| 2017/0228811 A1* | 8/2017 | Moreau | G06Q 30/0224 |

FOREIGN PATENT DOCUMENTS

| | | |
|---|---|---|
| CN | 106022870 | 10/2016 |
| WO | 2015017796 | 2/2015 |
| WO | 2015026863 | 2/2015 |

OTHER PUBLICATIONS

China Patent Office; Notification on the Grant of Patent Right for Invention issued in Application No. 201680078277.3; 4 pages; dated Aug. 9, 2021.

India Intellectual Property; Examination Report issue in Application No. 201847003804; 7 pages; dated Sep. 25, 2020.

International Search Report and Written Opinion of International Application No. PCT/US2016/061871, dated Jan. 5, 2017, 10 pp.

Target, "Testing, Testing, 1,2,3: Beacon Technology Arrives in 50 Target Stores," Target Brands, Inc., Aug. 5, 2015, Retrieved from <https://corporate.target.com/article/2015/08/beacon-technology> 14 pgs.

Gruman, "What you need to know about using Bluetooth beacons," InfoWorld, Retrieved from <http://www.infoworld.com/article/2608498/mobile-apps/what-you-need-to-know-about-using-bluetooth-beacons.html> Jul. 22, 2014, 4 pgs.

Miners, "Apple tracks shoppers in its stores with nationwide iBeacon rollout," InfoWord, Retrieved from <http://www.infoworld.com/article/2609408/ios/apple-tracks-shoppers-in-its-stores-with-nationwide-ibeacon-rollout.html> Dec. 9, 2013, 4 pgs.

Ricknäs, "Qualcomm releases Gimbal sensors for short-range tracking" InfoWord, Retrieved from <http://www.infoworld.com/article/2609026/ios/qualcomm-releases-gimbal-sensors-for-short-range-tracking.html> Dec. 9, 2013.

Colon, "MLB using Appel's iBeacons to create interactive stadium experiences," Gigaom, Retrieved from <http://gigaom.com/2013/09/27/mlb-using-apples-ibeacons-to-create-interactive-stadium-experiences/> Sep. 27, 2013, 5 pgs.

Paul, "You Can Now Let This Bluetooth Beacon Guide You Through Target Stores," Motherboard, Retrieved from <http://motherboard.vice.com/read/you-can-now-let-this-bluetooth-beacon-guide-you-through-target-stores> Aug. 6, 2015, 7 pgs.

Google, "Beacons Platform Overview," Google Developers, Retrieved from <https://developers.google.com/beacons/overview?h1=en> Sep. 11, 2015, 4 pgs.

Mehta, "6 ways mobile will change how you market in 2015," Venture Beat, Retrieved from <http://venturebeat.com/2015/01/02/6-ways-mobile-will-change-how-you-market-in-2015/> Jan. 2, 2015, 6 pgs.

Aislelabs, "The Hitchhikers Guide to iBeacon Hardware: A Comprehensive Report by Aislelabs (2015)," Aislelabs, Retrieved from <http://www.aislelabs.com/reports/beacon-guide/> May 4, 2015, 26 pgs.

Moore-Colyer, "Machine learning, Io T and big data: Retailers need to embrace latest tech or fall behind," V3, Incisive Business Media (IP) Limited, Retrieved from <http://www.v3.co.uk/v3-uk/feature/2419142/machine-learning-iot-and-big-data-retailers-need-to-embrace-latest-tech-or-fall-behind> Jul. 24, 2015, 4 pgs.

\* cited by examiner

AUTOMATIC DELIVERY OF CUSTOMER ASSISTANCE AT PHYSICAL LOCATIONS

BACKGROUND

Despite numerous technological advancements to online shopping experiences, the way in which customers typically purchase products from physical (or so-called "brick and mortar") stores has remained relatively unchanged over the years. If a customer needs assistance he or she may try to find an in-store associate to provide the information he or she needs. In some cases, an in-store associate may not always be easy to find and if a user has a question about a product, he or she may turn to a mobile device to manually execute a search (e.g., at an online retail website) for any additional information that the customer may need before completing a purchase in the store. In addition to being inconvenient and time consuming, a manual search may not always produce the exact answer or additional information the user needs to complete a purchase.

SUMMARY

In one example, the disclosure is directed to a method that includes determining, by a computing device, that the computing device is at a physical location associated with a merchant; determining, by the computing device, based on contextual information associated with the computing device, product information that is predicted to assist a user of the computing device in completing a purchase of a product, from the merchant, at the physical location; determining, by the computing device, a degree of likelihood that the user will complete the purchase in response to receiving the product information; outputting, by the computing device, an indication of the product information; and responsive to determining that the degree of likelihood does not satisfy a likelihood threshold, executing, by the computing device, a remote assistance module to provide a virtual environment in which a human provides additional information that the user needs to complete the purchase.

In another example, the disclosure is directed to a method that includes identifying, by a computing system, based on contextual information associated with a computing device that is located at a physical location associated with a merchant, and from a plurality of products for sale at the physical location, a product that a user of the computing device intends to purchase from the physical location; executing, by the computing system, a autonomous search query for product information that is predicted to assist the user in completing a purchase of the product, from the merchant, at the physical location; determining, by the computing system, whether a degree of likelihood that the user will complete the purchase in response to receiving the product information satisfies a likelihood threshold; sending, by the computing system, to the computing device, and for subsequent output by the computing device, the product information; and responsive to determining that the degree of likelihood does not satisfy the likelihood threshold, executing, by the computing system, a remote assistance module accessed by the computing device to provide a virtual environment in which a human provides additional information that the user needs to complete the purchase.

In another example, the disclosure is directed to a computing device that includes at least one processor; an input and output device configured to present a user interface associated with the computing device; a context module operable by the at least one processor to: determine that the computing device is at a physical location associated with a merchant; and obtain contextual information associated with the computing device; a user interface module operable by the at least one processor to: receive, based on the contextual information associated with the computing device, product information that is predicted to assist a user of the computing device in completing a purchase of a product, from the merchant, at the physical location, the product information having been assigned a degree of likelihood that the user will complete the purchase in response to receiving the product information; output, via the input and output device, an indication of the product information; and responsive to determining that the degree of likelihood does not satisfy a likelihood threshold, executing a remote assistance module to provide, using the input and output device, a virtual environment in which a human provides additional information that the user needs to complete the purchase.

The details of one or more examples are set forth in the accompanying drawings and the description below. Other features, objects, and advantages of the disclosure will be apparent from the description and drawings, and from the claims.

DETAILED DESCRIPTION

Figure 1:
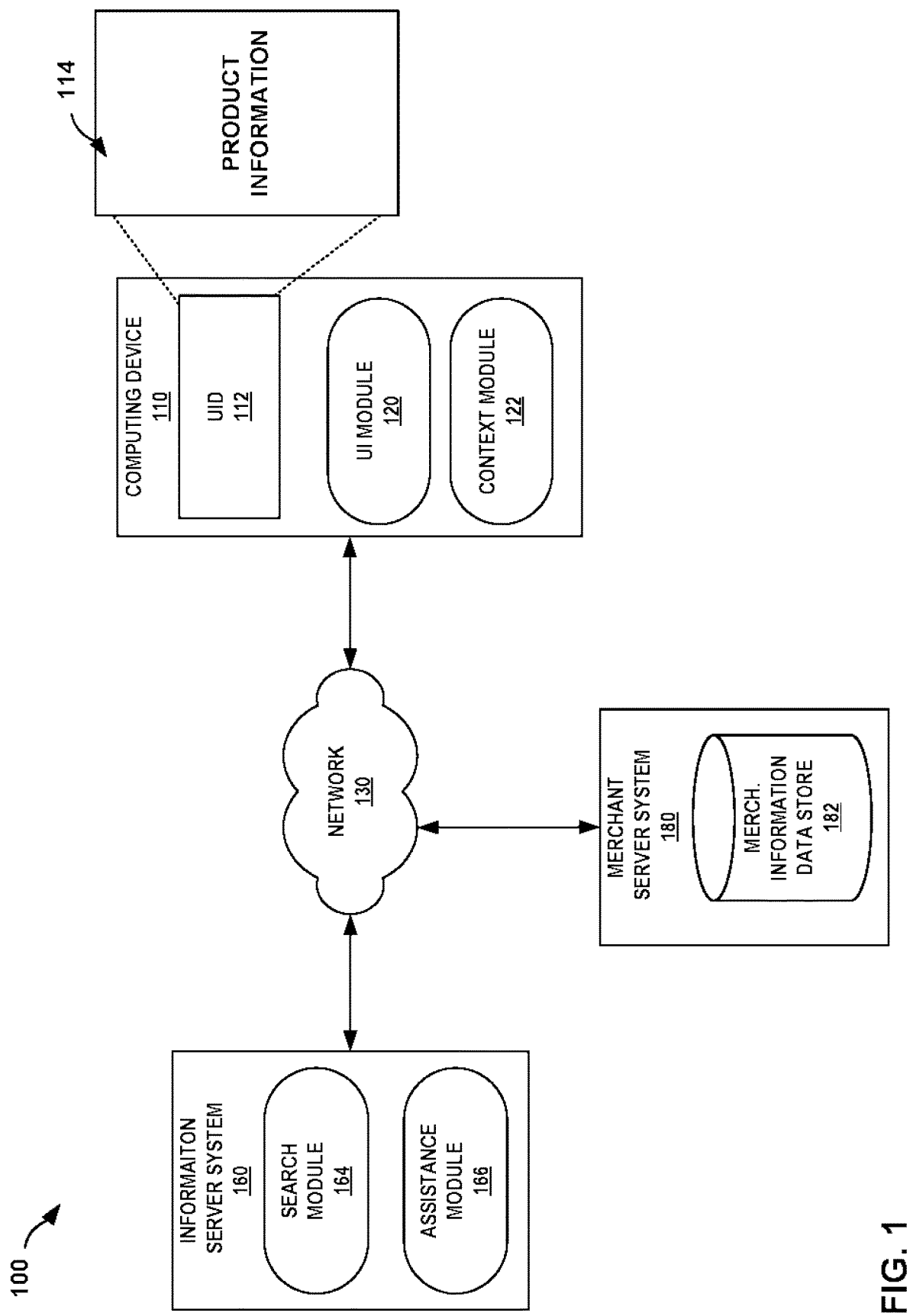
FIG. 1 is a conceptual diagram illustrating an example system for providing customer assistance to a user of a computing device at a physical location, in accordance with one or more aspects of the present disclosure.

In general, techniques of this disclosure may enable a computing device to access a multi-tier, customer assistance service for obtaining product information related to products being sold by a merchant when the computing device is located at a physical location associated with the merchant. A computing system may analyze contextual information associated with the computing device and determine the precise location of the computing device, with respect to the merchant's physical location (e.g., a "brick and mortar" store). Based on the location of the computing device (and other contextual information) the system may infer a product that a user of the computing device is intending to purchase from the store.

For example, as part of a first tier of the customer assistance service, the system may obtain (e.g., by executing an autonomous search such as a query not requiring explicit user input) product information that is predicted to assist the user in completing a purchase of the product. If the system determines that the product information is very likely to help the user or may lead to the user completing a purchase of the product, the system may cause the computing device to automatically present the product information to the user via an artificial intelligence (AI) or predictive information user interface (e.g., as a popup or notification). The AI or predictive information user interface may enable the system to receive additional information (e.g., via voice and text-based input) from the computing device and engage with the user of the computing device to try and answer all the questions that the user may have about the product. As the user interacts with the AI interface, the AI may continuously update and present additional product information that answers the user's questions if the system determines that the additional product information is very likely to help the user or may lead to the user completing a purchase of the product.

If however, the system is unable to obtain the product information that has a sufficient degree of certainty of being useful to the user in completing the purchase, the system may infer that the user requires a higher level of customer assistance. As part of a second tier of the customer assistance service, the system may invoke or execute a remote assistance module accessed by the computing device to provide a virtual environment (e.g., text-based or voice-based) in which a human may provide additional information that the user needs to complete the purchase. For example, the system may cause the computing device to present a chat window from which the user can interact with a human expert located in a remote call-center to obtain answers to questions he or she may have about the product.

Lastly, the system may determine (either automatically, or in response to input from the user or the remote assistance module) that the user may require an even higher level of customer assistance. As part of a third tier of the customer assistance service, the system may dispatch (e.g., by sending a notification to an in-store dispatch system) in-person assistance to the physical location. As a result of the dispatch, a customer service associate, who is an expert with the product, may arrive at the physical location of the store to provide the answers or information that the user needs to complete the purchase.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 1 is a conceptual diagram illustrating system 100 as an example system for providing customer assistance to a user of a computing device at a physical location, in accordance with one or more aspects of the present disclosure. System 100 includes information server system ("ISS") 160 in communication, via network 130, with merchant server system ("MSS") 180 and computing device 110. Although system 100 is shown as being distributed amongst ISS 160, MSS 180, and computing device 110, in other examples, the features and techniques attributed to system 100 may be performed internally, by local components of computing device 110. Similarly, ISS 160 may include certain components and perform various techniques that are otherwise attributed in the below description to MSS 180 and computing device 110.

Network 130 represents any public or private communications network, for instance, cellular, Wi-Fi, and/or other types of networks, for transmitting data between computing systems, servers, and computing devices. ISS 160 may communicate, via network 130, with computing device 110 to contextual information associated with computing device 110 that ISS 160 needs to provide customer assistance service to computing device 110 when computing device 110 is located at or near a physical location associated with a merchant. ISS 160 may further communicate, via network 130, with MSS 180 to obtain merchant information about the specific products and promotions being offered by the merchant at the physical location, that ISS 160 further needs to provide the customer assistance service being accessed by computing device 110. Computing device 110 may receive, via network 130, information associated with the customer assistance service provided by ISS 160, such as product information that ISS 160 infers will likely assist a user of computing device 110 in purchasing a product at the physical location.

Network 130 may include one or more network hubs, network switches, network routers, or any other network equipment, that are operatively inter-coupled thereby providing for the exchange of information between ISS 160, MSS 180, and computing device 110. Computing device 110, ISS 160, and MSS 180 may transmit and receive data across network 130 using any suitable communication techniques. ISS 160, MSS 180, and computing device 110 may each be operatively coupled to network 130 using respective network links. The links coupling computing device 110, MSS 180, and ISS 160 to network 130 may be Ethernet or other types of network connections and such connections may be wireless and/or wired connections.

Computing device 110 represents an individual mobile or non-mobile computing device. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant), a personal digital assistants (PDA), portable gaming systems, media players, e-book readers, mobile television platforms, automobile navigation and entertainment systems, or any other types of mobile, non-mobile, wearable, and non-wearable computing devices configured to receive information via a network, such as network 130.

Computing device 110 includes user interface device (UID) 112, user interface (UI) module 120, and context module 122. Modules 120-122 may perform operations described using software, hardware, firmware, or a mixture of hardware, software, and firmware residing in and/or executing at respective computing device 110. Computing device 110 may execute modules 120-122 with multiple processors or multiple devices. Computing device 110 may execute modules 120-122 as virtual machines executing on underlying hardware. Modules 120-122 may execute as one or more services of an operating system or computing platform. Modules 120-122 may execute as one or more executable programs at an application layer of a computing platform.

UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UID 112 may include microphone technologies, infrared sensor technologies, or other input device technology for use in receiving user input.

UID 112 may function as output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. In addition, UID 112 may include speaker technologies, haptic feedback technologies, or other output device technology for use in outputting information to a user.

UID 112 may include a presence-sensitive display that may receive tactile input from a user of computing device 110. UID 112 may receive indications of tactile input by detecting one or more gestures from a user (e.g., the user touching or pointing to one or more locations of UID 112 with a finger or a stylus pen). UID 112 may present output to a user, for instance at a presence-sensitive display. UID 112 may present the output as a graphical user interface (e.g., user interface 114), which may be associated with functionality provided by computing device 110 and/or a service being accessed by computing device 110.

For example, UID 112 may present a user interface (e.g., user interface 114) related to a customer assistance service provided by ISS 160 which UI module 120 accesses on behalf of computing device 110. In some examples, UID 112 may present a user interface related to autonomous search functions provided by UI module 120 or other features of computing platforms, operating systems, applications, and/or services executing at or accessible from computing device 110 (e.g., electronic message applications, Internet browser applications, mobile or desktop operating systems, etc.).

UI module 120 may manage user interactions with UID 112 and other components of computing device 110 including interacting with ISS 160 so as to provide autonomous search results at UID 112. UI module 120 may cause UID 112 to output a user interface, such as user interface 114 (or other example user interfaces) for display, as a user of computing device 110 views output and/or provides input at UID 112. UI module 120 and UID 112 may receive one or more indications of input from a user as the user interacts with the user interface, at different times and when the user and computing device 110 are at different locations. UI module 120 and UID 112 may interpret inputs detected at UID 112 and may relay information about the inputs detected at UID 112 to one or more associated platforms, operating systems, applications, and/or services executing at computing device 110, for example, to cause computing device 110 to perform functions.

UI module 120 may receive information and instructions from one or more associated platforms, operating systems, applications, and/or services executing at computing device 110 and/or one or more remote computing systems, such as ISS 160 and MSS 180. In addition, UI module 120 may act as an intermediary between the one or more associated platforms, operating systems, applications, and/or services executing at computing device 110, and various output devices of computing device 110 (e.g., speakers, LED indicators, audio or electrostatic haptic output device, etc.) to produce output (e.g., a graphic, a flash of light, a sound, a haptic response, etc.) with computing device 110.

In the example of FIG. 1, user interface 114 is a graphical user interface associated with a customer assistance service provided by ISS 160 and accessed by computing device 110. As shown in FIG. 1, user interface 114 presents "product information" that ISS 160 predicts will aid a user in completing a purchase of a product while at a physical location (e.g., a store) associated with a merchant. User interface 114 may present product information in various forms such as text, graphics, content cards, images, etc. UI module 120 may cause UID 112 to output user interface 114 based on data UI module 120 receives via network 130 from ISS 160. UI module 120 may receive graphical information (e.g., text data, images data, etc.) for presenting user interface 114 as input from ISS 160 along with instructions from ISS 160 for presenting the graphical information within user interface 114 at UID 112.

Context module 122 may collect contextual information associated with computing device 110 to define a context of computing device 110. Specifically, with respect to system 100, context module 122 is primarily used to define a context of computing device 110 that indicates where computing device 110 is physically located with respect to a physical location associated with a merchant (e.g., a merchant's "brick and mortar" store). However, context module 122 may be configured to define any type of context that specifies the characteristics of the physical and/or virtual environment of computing device 110 at a particular time.

As used throughout the disclosure, the term "contextual information" is used to describe any information that can be used by context module 122 to define the virtual and/or physical environmental characteristics that a computing device, and the user of the computing device, may experience at a particular time. Examples of contextual information are numerous and may include: sensor information obtained by sensors (e.g., position sensors, accelerometers, gyros, barometers, ambient light sensors, proximity sensors, microphones, and any other sensor) of computing device 110, communication information (e.g., text based communications, audible communications, video communications, etc.) sent and received by communication modules of computing device 110, and application usage information associated with applications executing at computing device 110 (e.g., application data associated with applications, Internet search histories, text communications, voice and video communications, calendar information, social media posts and related information, etc.). Further examples of contextual information include signals and information obtained from transmitting devices that are external to computing device 110. For example, context module 122 may receive, via a radio or communication unit of computing device 110, beacon information transmitted from external beacons located at or near a physical location of a merchant. As is described in greater detail below, context module 122 may use beacon information to define a context of computing device 110 that indicates the precise location of computing device 110 from within the interior space of a merchant's physical store.

Based on contextual information collected by context module 122, context module 122 may define a context of computing device 110 that places computing device 110 at a precise location from within the interior space of a merchant's physical location or physical store. Context module 122 may rely on merchant information obtained via network 130 from MSS 180 to supplement the contextual information obtained by context module 122 in determining the context of computing device 110. For example, by correlating the contextual information with merchant information (e.g., an electronic map or store layout, a list of beacon identifiers and their relative locations within the store, etc.), context module 122 may determine the precise location defined by the context of computing device 110 as being a particular row or aisle within a physical store, a nearest point of interest within the physical store, a department within the physical store, a coordinate location, an elevation, a level or floor of the store, a particular checkout station of the store, or any other type of locational identifier associated with the store.

For example, a merchant may place multiple beacons at various locations throughout a physical store and record the location and a corresponding beacon identifier associated with each beacon as merchant information at MSS 180. Although described primarily as using beacons, merchants may use other types of transmission devices such as wireless communication units (e.g., Bluetooth®, WiFi®, and radio frequency identifier [RFID] transmitters, other types of radio transmitters and receivers) cell towers, boosters, and the like, instead of or in addition to beacons. In any case, when computing device 110 is located at or near the physical store, context module 122 may receive beacon information from one or more of the multiple beacons. The beacon information may include a respective beacon identifier.

Context module 122 may use triangulation techniques to determine a closeness score associated with each of the multiple beacons and determine that the beacon with the highest closeness score is nearest to the precise location of computing device 110 from within the merchant's store. For example, for each beacon signal received by context module 122, context module 122 may determine signal strength associated with that particular beacon. Since signal strength alone may not be the most reliable way to determine a nearest beacon, context module 122 may ignore certain beacon signals and/or rely on other contextual information associated with computing device 110 to determine the nearest beacon. As one example, context module 122 may discard beacon signals with a very high signal strength (e.g., greater than ninety percent) and a very low signal strength (e.g., less than ten percent). Context module 122 may use the signal strengths along with accelerometer data, barometer data, wireless communication signals, detected service set identifiers or SSIDs, and other contextual information received by computing device 110 to determine a closeness score associated with each beacon. Using the closeness scores of each beacon, context module 122 may triangulate the precise location of computing device 110 from within a merchant's store.

As the signal strengths of the beacon signals change and the other contextual information changes, context module 122 may infer movement associated with computing device 110 and update the location of computing device 110 accordingly. For example, as a use moves throughout the rows or aisles of a store with computing device 110, context module 122 may determine subsequent beacon signal strengths, subsequent accelerometer data, and subsequent other contextual information, and re-triangulate the location of computing device 110 to be at or near a different beacon.

Context module 122 may transmit, over network 130, the current context of computing device 110 to ISS 160 from which ISS 160 may use the context to provide customer assistance to the user of computing device 110 and/or perform an autonomous search for information (e.g., product information, promotional information, etc.) related to the context of computing device 110. For example, context module 122 may send ISS 160 an indication of the precise location of computing device 110 from within the merchant's store. The indication of the precise location may correspond to a coordinate location of computing device 110, a department location within a physical store, a row location, bin location, aisle location, location of a nearest entrance or exit, cashier, or any other type of position information that ISS 160 can use to infer the relative location of computing device 110 from within a merchant's physical store.

ISS 160 and MSS 180 represent any suitable remote computing systems, such as one or more desktop computers, laptop computers, mainframes, servers, cloud computing systems, etc. capable of sending and receiving information both to and from a network, such as network 130. ISS 160 hosts (or at least provides access to) a customer assistance service associated with a physical merchant. MSS 180 hosts (or at least provides access to) merchant information (e.g., inventories, product locations, promotions, customer lists, etc.) associated with the physical merchant.

Computing device 110 may communicate with ISS 160 via network 130 to access the customer assistance service provided by ISS 160. ISS 160 may communicate with MSS 180 via network 130 to obtain the merchant information necessary for providing the customer assistance service to computing device 110. In some examples, ISS 160 represents cloud a computing system that provide access to the customer assistance service via the cloud.

In the example of FIG. 1, MSS 180 includes merchant information data store 182. The information stored by data stores 182 may be searchable and/or categorized. MSS 180 may provide access to the information stored at data store 182 as a cloud based, data-access service to devices connected to network 130, such as ISS 160 and computing device 110. For example, ISS 160 may provide input to MSS 180 requesting information from data stores 182, and in response to the providing the input, receive information via network 130 that is stored at data stores 182. Computing device 110 may request a map or list of beacon identifiers and their locations from within a physical store and receive via network 130, the map of beacon list as merchant information from MSS 180.

Examples of merchant information stored at data store 182 include locations of merchant stores, product inventories (e.g., quantities and locations within a store) associated with products being sold by the merchant at each of the locations of the merchant stores, electronic store maps, store layouts, beacon locations, beacon identifiers, and other information associated with the merchant associated with MSS 180. Other examples of merchant information include promotions, coupons, or other discount offers associated with the product inventories. Further examples of merchant information include customer information, such as loyalty program information, customer lists, transaction histories, and other information related to individual customers and their interactions and purchase histories at the merchant.

When data store 182 contains information associated with individual customers or when the information is genericized across multiple customers, all personally identifiable information such as name, address, telephone number, and/or e-mail address linking the information back to individual people may be removed before being stored at MSS 180. MSS 180 may further encrypt the information stored at data stores 182 to prevent access to any information stored therein. In addition, MSS 180 may only store information associated customers if those customers affirmatively consent to such collection of information. MSS 180 may further provide opportunities for customers to withdraw consent and in which case, MSS 180 may cease collecting or otherwise retaining the information associated with that particular customer.

In the example of FIG. 1, ISS 160 includes search module 164 and assistance module 166. Together, modules 164 and 166 provide a customer assistance service accessible to computing device 110 for automatically providing product information associated with products being sold at a physical location of a merchant associated with MSS 180. For example, module 164 and 166, through the customer assistance service, may eliminate the need to scan a barcode or a quick response (QR) code printed on the label of a product to obtain information about the product. Instead, modules 164 and 166 may cause computing device 110 to automatically display product information about a product that the user is likely contemplating purchasing when computing device 110 is near one or more beacons installed near the product (e.g., when the user is likely standing in front of the product displayed on a table, wall, cabinet, or shelf). Modules 164 and 166 may invoke a user interface at computing device 110 that allows the user (customer) to quickly find the product he is looking for (e.g., by displaying a carousel of the five closest products with product information (e.g., brief descriptions, ratings, reviews, drop down bar for size, color, additional inventory availability, and other product information).

Although shown as part of ISS 160, in some examples the operations performed by module 164 and 166 may be performed by UI module 120 of computing device 110. In other words, in some examples, UI module 120 may include the functionality and perform operations similar to those described being performed by modules 164 and 166.

Modules 164 and 166 may perform operations described using software, hardware, firmware, or a mixture of hardware, software, and firmware residing in and/or executing at ISS 160. ISS 160 may execute modules 164 and 166 with multiple processors, multiple devices, as virtual machines executing on underlying hardware, or as one or more services of an operating system or computing platform. In some examples, modules 164 and 166 may execute as one or more executable programs at an application layer of a computing platform of ISS 160.

Search module 164 may execute, based at least in part on a context of computing device 110, an autonomous search query to identify product information determined to be relevant to a user of computing device 110. Said differently, search module 164 may obtain product information that may be relevant to a user of computing device 110, for a current context of computing device 110, without receiving an explicit request from the user. Such a search in some instances is referred to as a "parameterless" or "autonomous" search.

For example, search module 164 may obtain information about one or more products nearest the location of computing device 110 when a user of computing device 110 is standing in-front of a product shelf in a merchant's physical store.

Search module 164 may determine the context of computing device 110 based on information obtained form context module 122. For example, search module 164 may receive, via network 130, an indication of a current location and/or nearest beacon to computing device 110. Search module 164 may generate a search query based on the context, and execute a search for information related to the search query. For example, search module 164, or assistance module 166 on behalf of search module 164, may query MSS 180 for a list of products closest to the nearest beacon or current location of computing device 110. Search module 164 may formulate a search query using the list of product names or other merchant information received from MSS 180.

Search module 164 may use natural language processing, machine learning, and/or other artificial intelligence techniques to learn and model user behavior, including what types of product information that users of computing device 110 and other computing devices typically search for, in a particular context. For example, search module 164 may generate a search query that is likely to obtain similar product information that was obtained from by previous search queries that have been performed on behalf of other computing devices at or near the physical location of computing device 110. Through learning and modeling searches of users for different contexts, search module 164 may generate one or more rules for automatically generating search queries that are likely to find product information that a user of computing device 110 will want to obtain, for a particular context.

Search module 164 may conduct an Internet search based on the auto-generated search query to identify product information related to the search query. After executing a search, search module 164 may output the product information returned from the search (e.g., the autonomous search results) to assistance module 166 before sending the product information to computing device 110.

In some examples, search module 164 may rely on additional information about a user of computing device 110, beyond the context of computing device 110, to generate a search query for product information. For example, search module 164 may rely on user information to generate the autonomous search query including: search histories, communication information (e.g., e-mail, text, calendar, social media, instant chat, etc.), online and physical store purchase histories, an electronic shopping list associated with the user, an electronic notepad associated with the user, a reminder list associated with the user, an electronic shopping list, purchase history, or communication information associated with a family member of the user, and any and all other information search module 164 may obtain about a user. For example, search module 164 may obtain information from MSS 180 indicating that the user of computing device 110 previously purchased a lamp on a previous visit to the merchant's store. Responsive to receiving contextual information from context module 122 that indicates the user is located at or near a section of the merchant's store where light bulbs are sold, search module 164 may formulate a search query that is more likely to produce product information about light bulbs that are compatible with the lamp the user previously purchased from the merchant's store rather than generic product information about light bulbs in general.

A natural language processing, machine learning system of search module 164 may score or rank the product information as to how relevant the information is to any individual product. For example, if the product information pertains only to light bulbs in general, the machine learning system of search module 164 may assign a mediocre ranking or score to the product information, whereas is if the product information pertains specifically to the product (e.g., the light bulb) sold on the shelf in front of the user, then the machine learning system of search module 164 may assign a higher ranking or score to the product information. As such, search module 164 may indicate whether the product information is more or less likely to assist a customer in the purchase of a specific product.

The machine learning system of search module 164 may rely on training data (e.g., based on feedback obtained from presenting similar product information to users of other computing devices in similar contexts) to train and learn which types of product information are more or less likely to assist a user in completing a purchase of a product. For example, if after presenting product information to a user for a particular product, the machine learning system of search module 164 receives merchant information from MSS 180 indicating that the user purchased the product, the machine learning system may rely on that positive feedback to provide similar product information in a similar context. If the opposite is true, that is, the machine learning system of search module 164 receives merchant information from MSS 180 indicating that the user did not purchase the product, the machine learning system may rely on that negative feedback to modify the product information prior to providing that product information to subsequent users in a similar context, or alternatively refrain from providing similar product information in a similar context. Said differently, the degree of likelihood or score that search module 164 assigns to product information that indicates whether the user will complete the purchase in response to receiving the product information is determined based at least in part whether other users completed purchases of the product in response to receiving the product information.

Assistance module 166 may manage the customer assistance service ISS 160 provides to computing device 110 for delivering product information that a user of computing device 110 may find helpful for completing a purchase of a product when located near a physical location of a merchant. That is, assistance module 166 may receive a context from context module 122, and determine, based on the context, that computing device 110 is at a physical location associated with a merchant. Assistance module 166 may further determine (e.g., based on the context and other merchant information obtained from MSS 180) a product that a user of the computing device is intending to purchase from the store. For example, assistance module 166 may query MSS 180 for information about one or more products within the merchant's inventory that are nearest to the location of computing device 110.

In response to determining that computing device 110 is at a physical location associated with a merchant, and as part of a first tier of the customer assistance service, assistance module 166 may invoke search module 164 to automatically execute a autonomous search query for product information that is predicted to assist the user in completing a purchase of the one or more products from the merchant, at the physical location. Assistance module 166 may send an indication of one or more products near computing device 110 and in response, assistance module 166 may receive a score, probability, or other degree of likelihood associated with the product information obtained by search module 164 for each of the one or more products.

If assistance module 166 determines that the product information is very likely to help the user or may lead to the user completing a purchase of the product, assistance module 166 may send the product information via network 130 to UI module 120 for presentation to the user (e.g., as user interface 114). For example, assistance module 166 may determine whether a degree of likelihood that the user will complete the purchase in response to receiving the product information satisfies a threshold. The degree of likelihood may correspond to a probability, ranking, score, etc. assigned by search module 164 when the machine learning system of search module 164 determined the relevancy of the product information to the product that the user is likely intending to purchase from the merchant's physical location.

Responsive to determining that the degree of likelihood satisfies a likelihood threshold (e.g., a fifty percent threshold, 0.7 out of 1.0, etc.), assistance module 166 may cause computing device 110 to output an indication of the product information. For example, assistance module 166 may send, via network 130 to UI module 120 of computing device 110, the product information along with an instruction for packaging the product information in the form of an information card that UI module 120 may cause to automatically surface for display at UID 112 for display to the user. The information card may include a carousel of one or more of the closest products located on the shelves in front of the user with brief description, ratings, reviews and drop down bar for size, color etc., to check the availability.

In the instances where assistance module 166 determines that the product information identified by search module 164 is not likely to assist the user in completing a purchase of the product, assistance module 166 may infer that the user requires a higher level of customer assistance and invoke a second tier of the customer assistance service. In other words, responsive to determining that the degree of likelihood associated with the product information returned from search module 164 does not satisfy the likelihood threshold, assistance module 166 may execute a remote assistance module to provide a virtual environment (e.g., text-based, voice-based, etc.) in which a human customer service representative associated with the assistance service interacts with the user and provides additional information that the user needs to complete the purchase. For example, assistance module 166 may cause UI module 120 of computing device 110 to present a chat window graphical user interface at UID 112 from which the user can interact with a human expert located in a remote call-center to obtain answers to questions the user of computing device 110 may have about the product.

Lastly, if assistance module 166 determines that the human customer service representative is unable to provide the user with the exact product information he or she needs to complete the purchase of the product in the store, assistance module 166 may escalate, as part of a third tier of the customer assistance service, support to be provided by a human located in the physical store. For example, assistance module 166 may dispatch in-person assistance to computing device 110's physical location associated with the merchant (e.g., the exact isle and/or bin location) in response to determining that the remote human assistance module is unable to provide, via the virtual environment, the additional information that the user needs to complete the purchase. Assistance module 166 may send a notification to an in-store dispatch system operated by MSS 180, which notifies (e.g., via a pager system, etc.) a human expert that is local and on-site at the store. As a result of the dispatch, a customer service associate, who is an expert with the product, may arrive at the physical location of the store to provide the answers or product information that the user needs to complete the purchase.

Despite numerous technological advancements to online shopping experiences, the way in which customers typically purchase products from physical (or so-called "brick and mortar") stores has remained relatively unchanged over the years. Customers may spend time moving through isles of products in a store and searching for a particular product they want to buy. If a customer needs assistance or has a question about a product, he or she may embark on what may seem like an endless journey to find a sales associate that is qualified to answer the question or provide the assistance. In other cases, the customer, while located in the physical store, may simply turn to his or her mobile device to manually execute a search (e.g., at an online retail website) for any additional information that the customer may need before completing a purchase in the store. With the option to purchase almost anything online, and whether it be due to time wasted searching for products on shelves, searching for sales associates, or searching for additional information needed to make an informed purchase of a product while in the store, some retailers may find that their customers are becoming less interested, if not increasingly dissatisfied, in buying goods from their physical stores.

To address the above identified problems with current physical store shopping experiences, the techniques of this disclosure may provide a customer assistance service from which a computing device can automatically obtain product information needed by a user to complete a purchase of a product from a physical location of a merchant. The customer assistance service automatically escalates its level of service across multiple tiers of service (e.g., from an artificial intelligence system, to a remote human, to an on-site human expert) until the user has the information he or she needs. In this way, the system does not require the scanning of a barcode or QR code and the user need not expend effort running down a sales associate who may or may not even be able to answer the customer's question. Furthermore, as the system provides product information and customer assistance automatically, users of the system need not interact with their devices to perform manual searches (e.g., at an online retail website) for any additional information that the customers may need before completing a purchase in the store. Users of the system may provide fewer inputs to their devices to cycle through product information and execute manual searches for information. With fewer inputs from a user, the example system may enable computing devices to conserve energy and use less battery power as compared to other systems that do not have access to the customer assistance service described herein.

Figure 2:
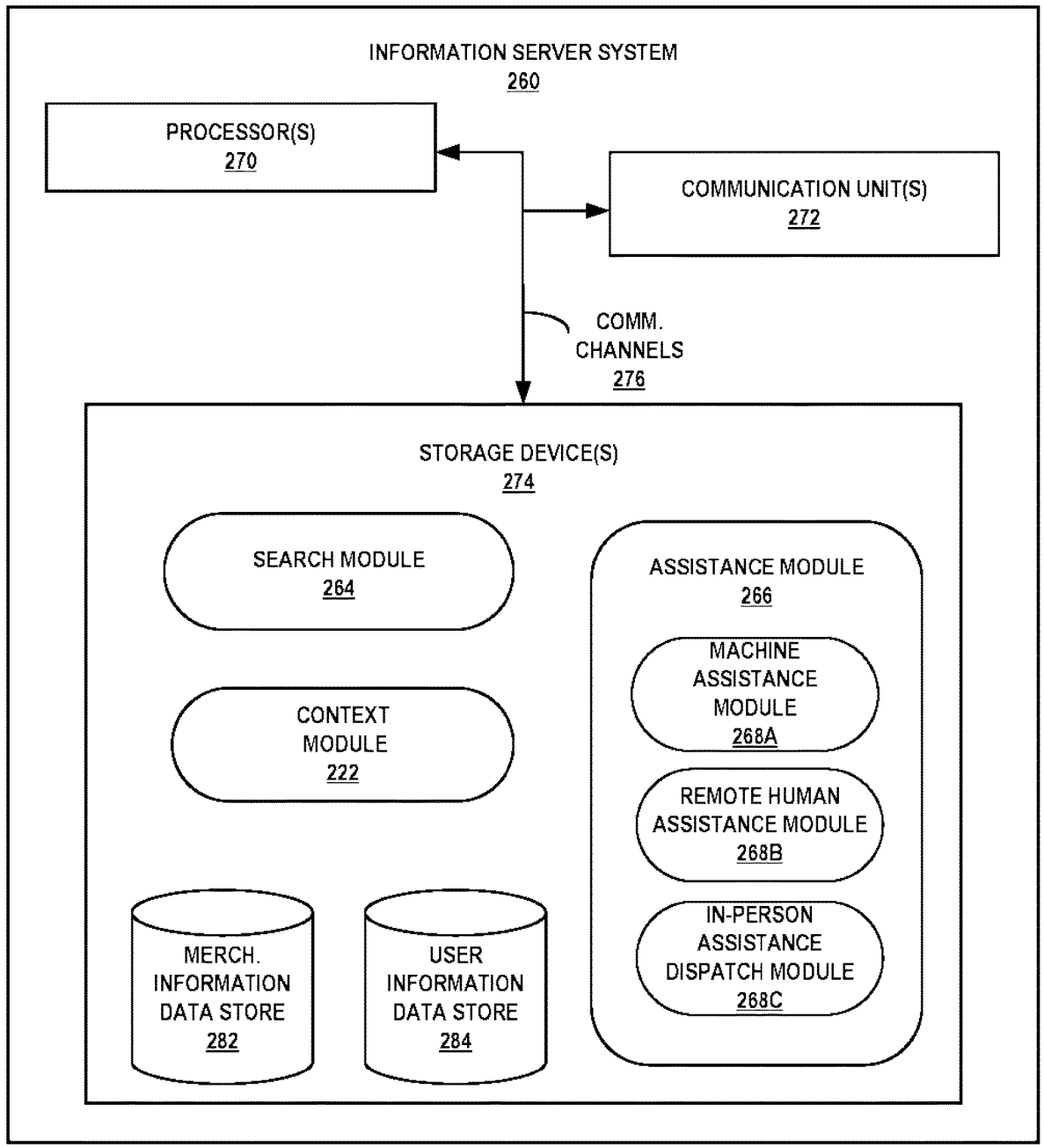
FIG. 2 is a block diagram illustrating an example computing system that is configured to provide customer assistance to a user of a computing device at a physical location, in accordance with one or more aspects of the present disclosure.

FIG. 2 is a block diagram illustrating ISS 260 as an example computing system that is configured to provide customer assistance to a user of a computing device at a physical location, in accordance with one or more aspects of the present disclosure. ISS 260 is a more detailed example of ISS 160 of FIG. 1 and is described below within the context of system 100 of FIG. 1. FIG. 2 illustrates only one particular example of ISS 260, and many other examples of ISS 260 may be used in other instances and may include a subset of the components included in example ISS 260 or may include additional components not shown in FIG. 2.

ISS 260 provides computing device 110 with a conduit in which a computing device, such as computing device 110, may access a customer assistance service for automatically receiving product information that is relevant for a current context of the computing device. As shown in the example of FIG. 2, ISS 260 includes one or more processors 270, one or more communication units 272, and one or more storage devices 274. Storage devices 274 of ISS 260 include context module 222, search module 264, and assistance module 266. Within assistance module 266, storage devices 274 includes machine assistance module 268A, remote human assistance module 268B, and in-person assistance dispatch module 268C (collectively "modules 268"). Modules 222, 264, and 266 include at least the same, if not more, capability as, respectively, modules 122, 164 and 166 of FIG. 1. Storage devices 274 of ISS 260 further includes merchant information data store 282 and user information data store 284.

Communication channels 276 may interconnect each of the components 270, 272, and 274 for inter-component communications (physically, communicatively, and/or operatively). In some examples, communication channels 276 may include a system bus, a network connection, an inter-process communication data structure, or any other method for communicating data.

One or more communication units 272 of ISS 260 may communicate with external computing devices, such as computing device 110 of FIG. 1, by transmitting and/or receiving network signals on one or more networks, such as network 130 of FIG. 1. For example, ISS 260 may use communication unit 272 to transmit and/or receive radio signals across network 130 to exchange information with computing device 110. Examples of communication unit 272 include a network interface card (e.g. such as an Ethernet card), an optical transceiver, a radio frequency transceiver, a GPS receiver, or any other type of device that can send and/or receive information. Other examples of communication units 272 may include short wave radios, cellular data radios, wireless Ethernet network radios, as well as universal serial bus (USB) controllers.

Storage devices 274 may store information for processing during operation of ISS 260 (e.g., ISS 260 may store data accessed by modules 222, 264, 266, and 268 during execution at ISS 260). In some examples, storage devices 274 are a temporary memory, meaning that a primary purpose of storage devices 274 is not long-term storage. Storage devices 274 on ISS 260 may be configured for short-term storage of information as volatile memory and therefore not retain stored contents if powered off. Examples of volatile memories include random access memories (RAM), dynamic random access memories (DRAM), static random access memories (SRAM), and other forms of volatile memories.

Storage devices 274, in some examples, also include one or more computer-readable storage media. Storage devices 274 may be configured to store larger amounts of information than volatile memory. Storage devices 274 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EE- PROM) memories. Storage devices 274 may store program instructions and/or data associated with modules 222, 264, 266, and 268.

One or more processors 270 may implement functionality and/or execute instructions within ISS 260. For example, processors 270 on ISS 260 may receive and execute instructions stored by storage devices 274 that execute the functionality of modules 222, 264, 266, and 268. These instructions, when executed by processors 270, may cause ISS 260 to store information, within storage devices 274 during program execution. Processors 270 may execute instructions of modules 222, 264, 266, and 268 to execute autonomous searches and rank autonomous search results based at least in part on dynamic properties of the computing devices for which the autonomous search results are intended. That is, modules 222, 264, 266, and 268 may be operable by processors 270 to perform various actions or functions of ISS 260 which are described herein.

The information stored at data stores 282 and 284 may be searchable and/or categorized. For example, one or more modules 222, 264, 266, and 268 may provide input requesting information from one or more of data stores 282 and 284 and in response to the input, receive information stored at data stores 282 and 284. ISS 260 may provide access to the information stored at data stores 282 and 284 as a cloud based, data-access service to devices connected to network 130, such as computing device 110. When data stores 282 and 284 contain information associated with individual users or when the information is genericized across multiple users, all personally-identifiable-information such as name, address, telephone number, and/or e-mail address linking the information back to individual people may be removed before being stored at ISS 260. ISS 260 may further encrypt the information stored at data stores 282 and 284 to prevent access to any information stored therein. In addition, ISS 260 may only store information associated with users of computing devices if those users affirmatively consent to such collection of information. ISS 260 may further provide opportunities for users to withdraw consent and in which case, ISS 260 may cease collecting or otherwise retaining the information associated with that particular user.

Merchant information data store 282 is similar to merchant information data store 182 of MSS 180 and stores merchant information that ISS 260 may use in providing a customer assistance service to computing device 110. Examples of merchant information stored at data store 282 include locations of merchant stores, product inventories (e.g., quantities and locations within a store) associated with products being sold by the merchant at each of the locations of the merchant stores, electronic store maps, store layouts, beacon locations, beacon identifiers, and other information associated with a merchant. Other examples of merchant information include promotions, coupons, or other discount offers associated with the product inventories. Further examples of merchant information may include customer information, such as loyalty program information, customer lists, transaction histories, and other information related to individual customers and their interactions and purchase histories at the merchant.

User information data store 284 may store information associated with the user of computing device 110. In some examples, search module 264 may rely on additional information about a user of computing device 110, beyond the context of computing device 110, to generate a search query for product information. For example, search module 264 may rely on user information contained in data store 284 to generate the autonomous search query. Examples of user information stored at data store 284 include: search histories, communication information (e.g., e-mail, text, calendar, social media, instant chat, etc.), online and physical store purchase histories, an electronic shopping list associated with the user, an electronic notepad associated with the user, a reminder list associated with the user, an electronic shopping list, purchase history, or communication information associated with a family member of the user, and any and all other information search module 264 may obtain about a user from the user's interactions with computing device 110 and/or the user's interaction with a merchant.

For example, search module 264 may obtain information from MSS 180 indicating that a family member associated with the user of computing device 110 previously purchased a particular type of electric tooth brush on a previous visit to the merchant's store. Responsive to receiving contextual information from context module 222 that indicates the user is located at or near a section of the merchant's store where tooth brush replacement heads are sold, search module 264 may formulate a search query that is more likely to produce product information about replacement heads that are compatible with the electric tooth brush purchased by the user's family member rather than product information about other replacement heads that may not be compatible with the family member's toothbrush purchase.

In some examples, search module 164 may determine product information that is predicted to assist a user in completing a purchase of a product for sale at a physical location associated with a merchant in response to receiving a prior search query associated with the product. For example, a search history associated with the user of computing device 110, stored at data store 284, may indicate that the user, just prior to arriving at the merchant location was searching for stores that had parts for a particular brand of lawnmower. When formulating the autonomous search query, search module 164 may skew the query to obtain information about products that are compatible with the particular brand of lawnmower that was mentioned in the search history.

In some examples, search module 164 may determine product information that is predicted to assist a user in completing a purchase of a product for sale at a physical location associated with a merchant based at least in part on search results obtained from search queries associated with the product that have been performed at the physical location by other computing devices. For example, data store 284 may include search histories performed by users of other computing devices while the other computing devices were located at the physical location of the merchant. The search histories may be tagged with location information that indicates the nearest beacon or precise location within the merchant's store where they searches were executed. Search module 264 may infer that if a particular search query has been performed at a location of computing device 110 with a particular frequency, that the user of computing device 110 may also find the same type of product information that the other users were searching for.

Context module 222 may receive contextual information associated with computing device 110 via network 130, and similar to context module 122 of computing device 110, context module 222 may generate a context associated with computing device 110. With regards to the customer assistance service provided by ISS 260, the primary purpose of context module 222 may be to determine a precise location of computing devices, such as computing device 110, when the computing devices are located within the interior space of a physical location associated with a merchant. In other words, context module 222 may be configured to pinpoint the interior location of a computing device (e.g., down to the specific aisle and/or nearest bin location) within a store, even without the availability a GPS signal.

For instance, based on contextual information received from computing device 110, context module 222 may determine that computing device 110 at the physical location of the merchant. In some examples, the contextual information received from computing device 110 may include at least one of: accelerometer data, wireless communication data, or beacon information obtained by sensors and radios of computing device 110 from multiple beacons, and wireless communication devices, when computing device 110 is located at or near a physical location associated with a merchant. Context module 222 may track the signal strength associated with multiple beacons and discard those beacon signals that are inconsistent beacon signals. Context module 222 may assign a higher closeness score to beacons with higher signal strengths and assign a lower closeness score to beacons with lower signal strengths.

Although described as accelerometer data, other sensor data may be used as well to determine the location of computing device 110. Examples of other sensor data include barometer data, ambient light sensor data, proximity sensor data, gyroscopic sensor data, etc. Examples of wireless communication data include Bluetooth®, WiFi®, cellular radio data (e.g., LTE®, 3G, 4G, etc.), radio frequency chip, infared receiver data, near field communication data (NFC), etc.

Context module 222 may use the accelerometer data and/or wireless communication data to adjust and improve the closeness score associated with each of the multiple beacons. For instance, context module 222 may use the beacon strength in addition to accelerometer data and/or wireless communication data to determine the closeness score of each beacon.

Context module 222 may infer that when a single beacon has a higher signal strength than the other beacons, that the position of computing device 110 is nearest that single beacon. If however there are multiple beacons with high signal strength of approximately equal values, context module 222 may weight the wireless communication and/or accelerometer data higher when determining the closeness score of each of the multiple beacons. In other words, responsive to determining that the beacon information is associated with multiple beacons context module 222 may prioritize the wireless communication data over the beacon information for determining that computing device 110 is at the physical location.

In some examples, context module 222 may deprioritize the beacon information for determining that future computing devices are at the physical location in response to receiving a user input for dismissing the product information. For example, context module 222 may receive feedback information from assistance module 266 that context module 222 then uses to improve the closeness scores determined for beacons. Assistance module 266 may receive information from computing device 110 that indicates the user of computing device 110 dismissed or ignored the product information that was presented to the user as part of the customer assistance service provided by ISS 260. Assistance module 266 may share the received information with context module 222. Context module 222 may adjust its closeness score computations for future context determinations based on whether the user dismissed or did not dismiss the product information presented to the user. Context module 222 may infer that the beacon information used to determine the location of computing device 110 is not accurate (or at least less accurate than wireless communication and accelerometer data) if assistance module 266 determines that the user did not perceive the product information to be useful.

In some examples, context module 222 may use merchant information (e.g., from MSS 180) to determine the location of computing device 110 within a physical space associated with a merchant. For instance, context module 222 may obtain data that indicates the position of each of the multiple beacons and wireless communication devices relative to the interior region of a merchant's physical location. Responsive to identifying a nearest beacon or wireless communication device, context module 222 may determine that the location of computing device 110 corresponds to the location of that nearest beacon or wireless communication device.

In some examples, context module 222 can calibrate the accelerometer data received from computing device 110 using beacon information obtained from low coverage, high frequency beacons (e.g., 900 mhz). For instance, a merchant may place low coverage, high frequency beacons that are easily detected when a computing device is very close (e.g., nearby) but cannot be detected when far away. For example, such a beacon may be a radio beacon in the 900 mhz spectrum, other all-purpose radio spectrum, or any other suitable spectrum obtained via government license, etc., that is also of very low output power such that a receiving device needs to be close (e.g., near the aisle at which the beacon is located) to receive the signal. The merchant can place low coverage, high frequency beacons at chokepoints (e.g., entrances, exits, main traffic areas, etc.) of a store. When context module 222 detects beacon information from one or more beacons located in chokepoints, context module 222 may calibrate the accelerometer data received from computing device 110 to a particular location and compute relative X, Y, Z displacement from that chokepoint. As such, context module 222 may eliminate walk over of non-aisle areas or other locations where products are not typically present, to determine the location of computing device 110. In addition to low coverage, high frequency beacons, other types of transmission devices, such as RFID transmission devices may be used at chokepoints and context module 222 may similarly calibrate the accelerometer data when RFID information is received from computing device 110.

Assistance module 266 may manage the customer assistance service ISS 260 provides to computing device 110 for delivering product information that a user of computing device 110 may find helpful for completing a purchase of a product when located near a physical location of a merchant. In the example of FIG. 2, assistance module 266 includes machine assistance module 268A.

Machine assistance module 268A provides a first tier of support or customer assistance to a user of computing device 110. For example, machine assistance module 268A may automatically cause product information to surface for presentation to a user of computing device 110 if assistance module 266 infers that a user of computing device 110 is likely to find the product information helpful in completing a purchase.

Machine assistance module 268 includes an artificial intelligence system and/or a machine learning based natural language processing system that parses merchandise information data store 282 for data about products offered for sale by a merchant associated with the physical location of computing device 110, data about current inventory levels in the particular store at the physical location as well as other stores of the merchant, and data about deals associated with specific items.

In some examples, machine assistance module 268A may receive additional information from computing device 110 (e.g., via voice and/or text-based input from the user) and an artificial intelligence system of assistance module 266 may engage with the user of computing device 110, based on the additional information, to try and obtain specific product information that answers all the questions that the user may have about the product. For example, after surfacing the product information at UID 112, UI module 120 may receive an indication of voice-input from the user of computing device 110 that includes audio data representative of a question being asked by the user. Machine assistance module 268A may break down the audio data into specific parts of a sentence structure and pass the individual parts of the audio data through natural language processing algorithms to determine the subject object, verb and other important parts of the sentence. Then, machine assistance module 268 may input the sentence parts into inference algorithms to find a proper match. Additionally, machine assistance module 268A may pick up inventory levels from merchant information data store 282 for the item being inquired about by the user.

In some examples, machine assistance module 268A may utilize the contextual information received by context module 222 to further disambiguating which product(s) the user is inquiring about. For example, context module 222 may share with machine assistance module 268A the recent accelerometer data received from computing device 110 as well as the beacon information and closeness scores, and machine assistance module 268A may determine the items near the location of computing device 110. For instance, machine assistance module 268A may use the contextual information received by context module 22 to discern between ambiguous product names or descriptions in a question from a user.

Machine assistance module 268A may determine a score associated with the product information obtained in answering a question from a user. In cases where machine assistance module 268A fails to obtain a satisfactory answer (e.g., where the score is less than a threshold matching any existing object), assistance module 266 may escalate the customer assistance service to the next tier of service. In other words, responsive to determining that a degree of likelihood that the user will complete a purchase of a product in response to receiving a specific piece of product information does not satisfy a likelihood threshold, assistance module 266 may execute remote human assistance module 268B.

In some examples, machine assistance module 268A may determine, based on the context of computing device 110 and merchant information stored at data store 282, a beacon nearest to the physical location of the merchant. For example, machine assistance module 268A may query the location within data store 282 and receive an indication of the nearest beacon at the physical location of the merchant. Machine assistance module 268A may further query the nearest beacon within data store 282 and obtain information about the products that are fore sale within a threshold distance (e.g., one foot, one meter, etc.) of the beacon. Machine assistance module 268A may identify the product being purchased from the merchant at the physical location from among the products that are within the threshold distance of the nearest beacon.

In some examples, machine assistance module 268A may identify the product being purchased from the merchant at the physical location from among the products that are within the threshold distance of the nearest beacon, and further, based at least in part on a search history of the user. In other words, if several products are for sale within the threshold distance of the nearest beacon, machine assistance module 268A may determine whether any of the nearest products corresponds to a product indicated in a search history of the user stored at data store 284. Machine assistance module 268A infer that if the user of computing device 110 is located near several products that he or she most likely is looking to purchase the product that appears in a recently executed search history.

In some examples, assistance module 266 may invoke or execute remote human assistance module 268B in response to receiving a user input for dismissing the product information. In other words, computing device 110 may detect user input at UID 112 that indicates the user either did not view or listen to the product information presented at UID 112, or may receive user input at UID 112 that indicates the product information was not helpful to the user (e.g., if the user provides speech or touch input to computing device 110 indicating as much). In any case, assistance module 266 may receive an indication of the user input detected by computing device 110 and discern that machine assistance module 268A is not providing the kind of service that the user may expect or need. In response to determining that the user of computing device 110 may be dissatisfied with the product information provided by machine assistance module 268A, assistance module 266 may execute remote human assistance module 268B.

Remote human assistance module 268B represents a remote assistance module for providing a virtual environment in which a human provides additional information that the user needs to complete the purchase. The virtual environment provided by remote human assistance module 268B may include at least one of a text-based communication environment, a video-based communication environment, or a voice-based communication environment. In other words, module 268B may cause UI module 120 of computing device 110 to present a text-based, video-based, or voice-based chat user interface to communicate with a human in a remote call center. The human may have access to similar information that machine assistance module 268 has access to—only the human may also use his or her intuition to better judge or make an educated guess as to whether the product information he or she can obtain for the user will be helpful or not.

Although shown in the example of FIG. 2 as being part of assistance module 266, in some examples, remote human assistance module 268B may be part of UI module 120 of computing device 110. In other words, computing device 110 may include a local, remote assistance module and the remote assistance module may be operable by at least one processor of computing device 110 to provide a virtual environment in which a human provides additional information that the user needs to complete the purchase.

In some examples, assistance module 266 may invoke in-person assistance dispatch module 268C if assistance module 266 determines that the user may not be receiving adequate information that he or she needs to complete a purchase of a product. Assistance module 266 may send a notification to a merchant system (e.g., MS 180) to dispatch in-person assistance to the physical location associated with the merchant in response to determining that the remote human assistance service is unable to provide the additional information that the user needs to complete the purchase. For example, the human in the call-center that is providing support through the virtual environment provided by module 268B may provide input to his or her device to send a message to assistance module 260 that indicates the user of computing device 110 needs a higher level of service. In some examples, by invoking in-person assistance dispatch module 268C, may cause module 268C to send MSS 180 (or some other merchant system) an indication or other notification that a user of the computing device requires in-person assistance and the physical location at which the user requires the in-person assistance. The message sent by module 268C to MSS 180 may indicate the exact aisle and/or bin ranges at which the user of computing device 110 is located and may cause an in-store employee to arrive at the location.

FIGS. 3A through 3D are conceptual diagrams illustrating example graphical user interfaces 314A through 314D presented by an example computing device 310 that is configured to provide customer assistance to a user of computing device 310 at a physical location, in accordance with one or more aspects of the present disclosure. Computing device 310 is an example of computing device 110 of system 100 of FIG. 1. FIGS. 3A through 3D are described below in the context of system 100 of FIG. 1.

In the example of FIGS. 3A through 3D, computing device 310 is a mobile phone or a tablet device. Computing device 310 includes UID 312 which is configured to display user interfaces 314A-314D.

User interface 310A includes first product information being automatically surfaced and presented to a user of computing device 310 in response to computing device 110 determining that computing device 310 is at a physical location associated with a merchant and further in response to determining that the first product information has a degree of likelihood of enabling the user to complete a purchase of a product, from the merchant, at the physical location, in response to receiving the product information. For example, the first product information may include a brief product description, reviews, ratings, price information, inventory information, etc. User interface 310A also includes an input box for receiving text input (or speech input) from a user if the user would like to input a question the user would like to have answered about a nearby product. For instance, when a user of computing device 310 clicks the "ask me anything" button in user interface 314A, he/she may start chatting with an intelligent auto-replying system of computing device 310 that can understand written or spoken questions from the user and also reply to the user in written or audible replies (e.g., by using natural language processing, deep learning, machine learning, and/or other artificial intelligence technologies).

Figure 3A:
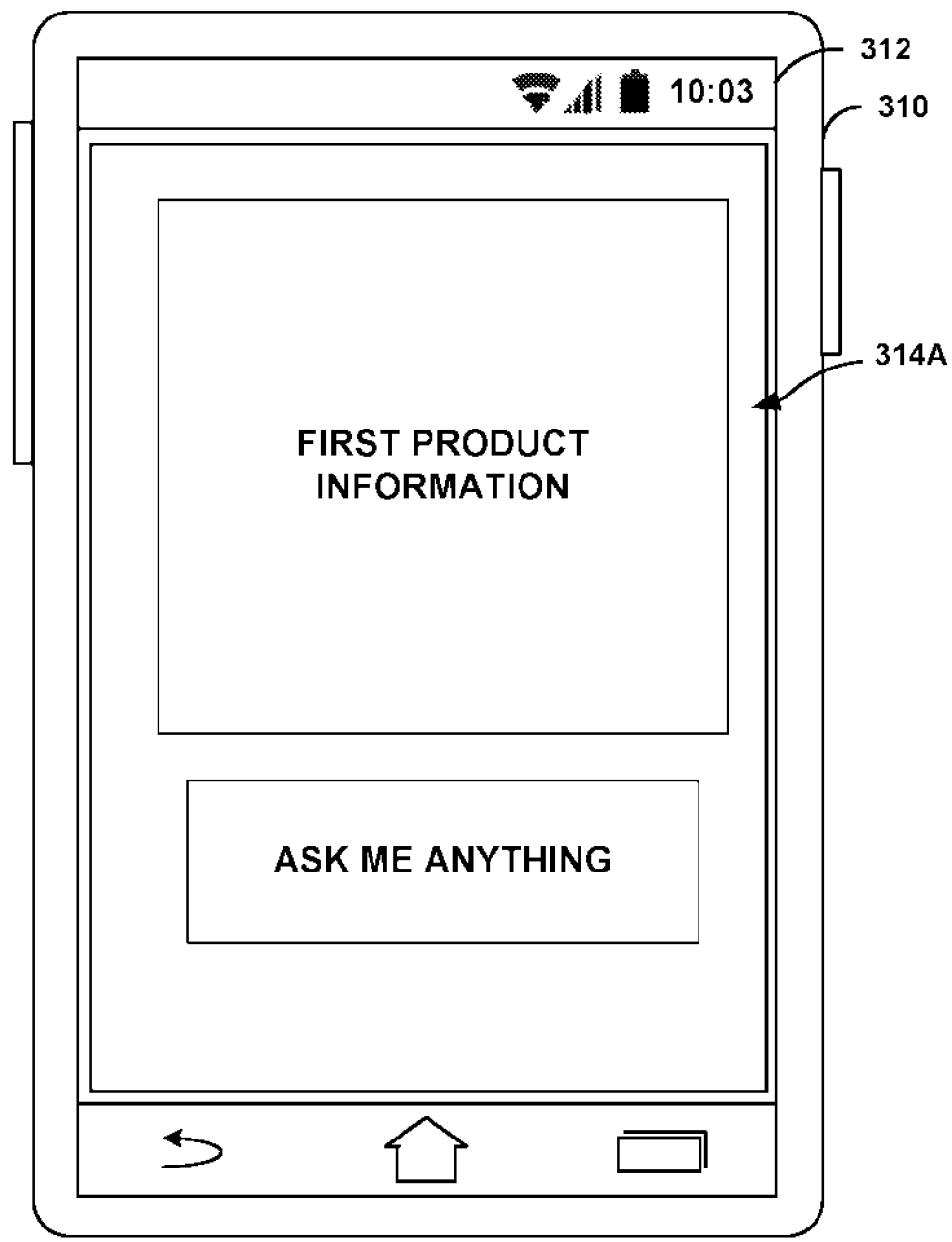
FIG. 3A, FIG. 3B, FIG. 3C and FIG. 3D are conceptual diagrams illustrating example graphical user interfaces presented by an example computing device that is configured to provide customer assistance to a user of the computing device at a physical location, in accordance with one or more aspects of the present disclosure.
Figure 3B:
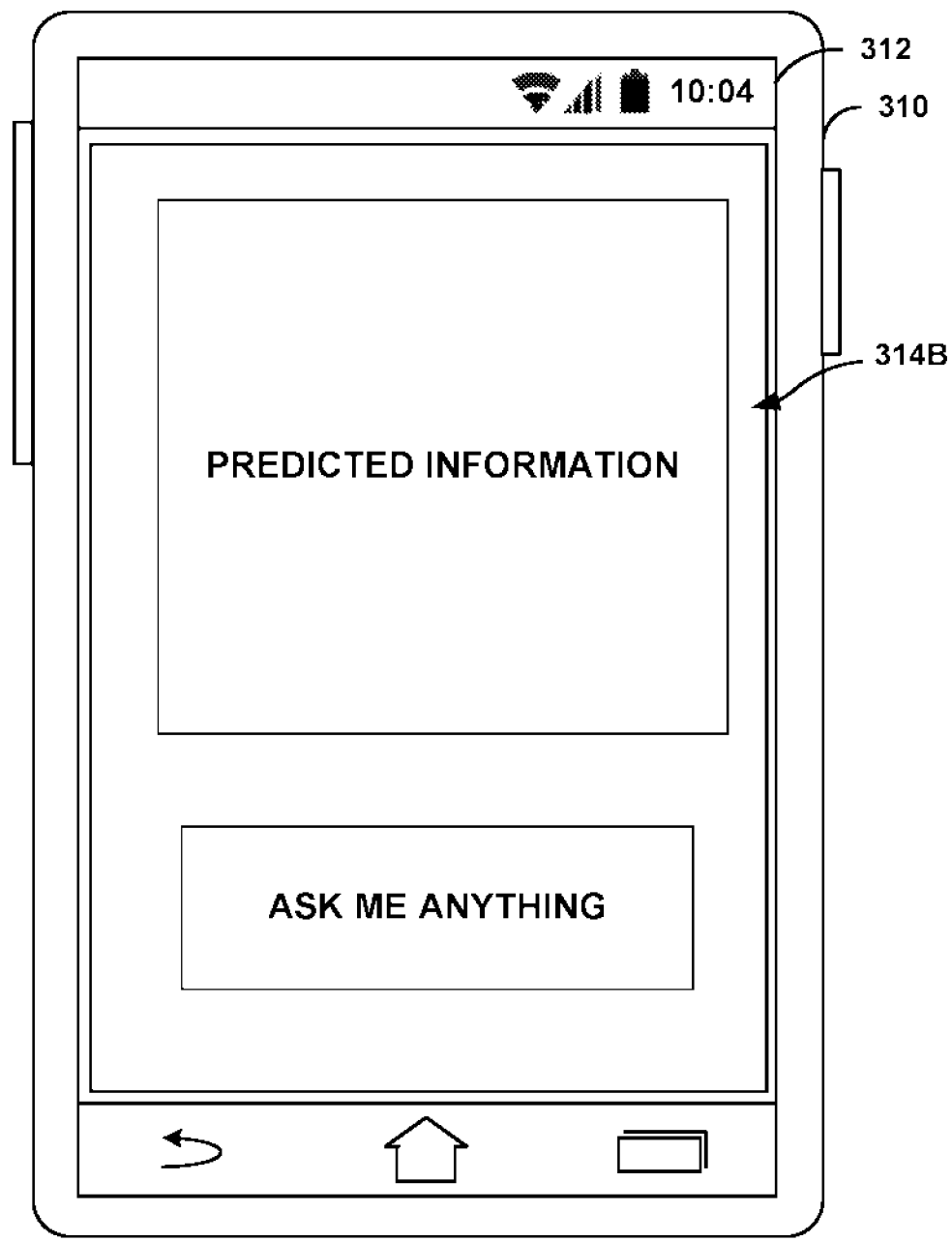

For example, FIG. 3B shows computing device 310 presenting user interface 310B which includes predicted information being presented at UID 312 in response to computing device 110 receiving audio input that represents a question being asked by the user of computing device 310. Computing device 310 may present the predicted information in response to determining that a degree of likelihood associated with the predicted information satisfies a likelihood threshold for assisting the user in completing a purchase of a product. In other words, computing device 310 may only present the predicted information if computing device 310 is more certain than not that the user will find the predicted information helpful.

Figure 3C:
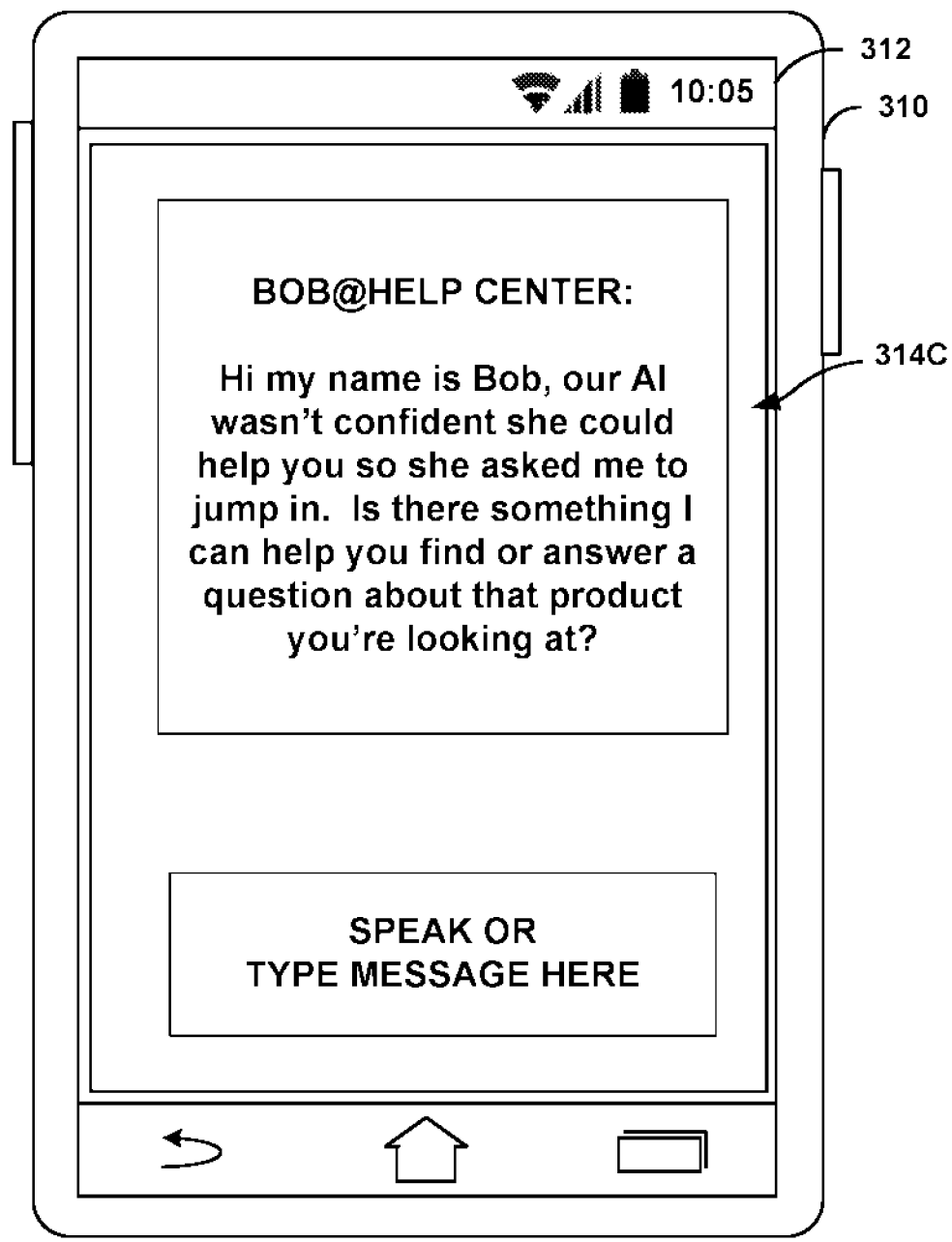

FIG. 3C shows computing device 310 presenting user interface 314C at UID 312 in response to determining that the predicted information computing device 310 obtains in response to a user question, does not have a sufficiently high score or degree of likelihood of being useful. In this case, computing device 310 has executed a remote human assistance module for providing a virtual environment in which a human provides additional information that the user needs to complete the purchase. As shown in FIG. 3C, computing device 310 presents a chat window from which the user of computing device 310 can communicate with Bob (a human) located in a remote call center to obtain product information the user may need in order to complete a purchase of a product.

Figure 3D:
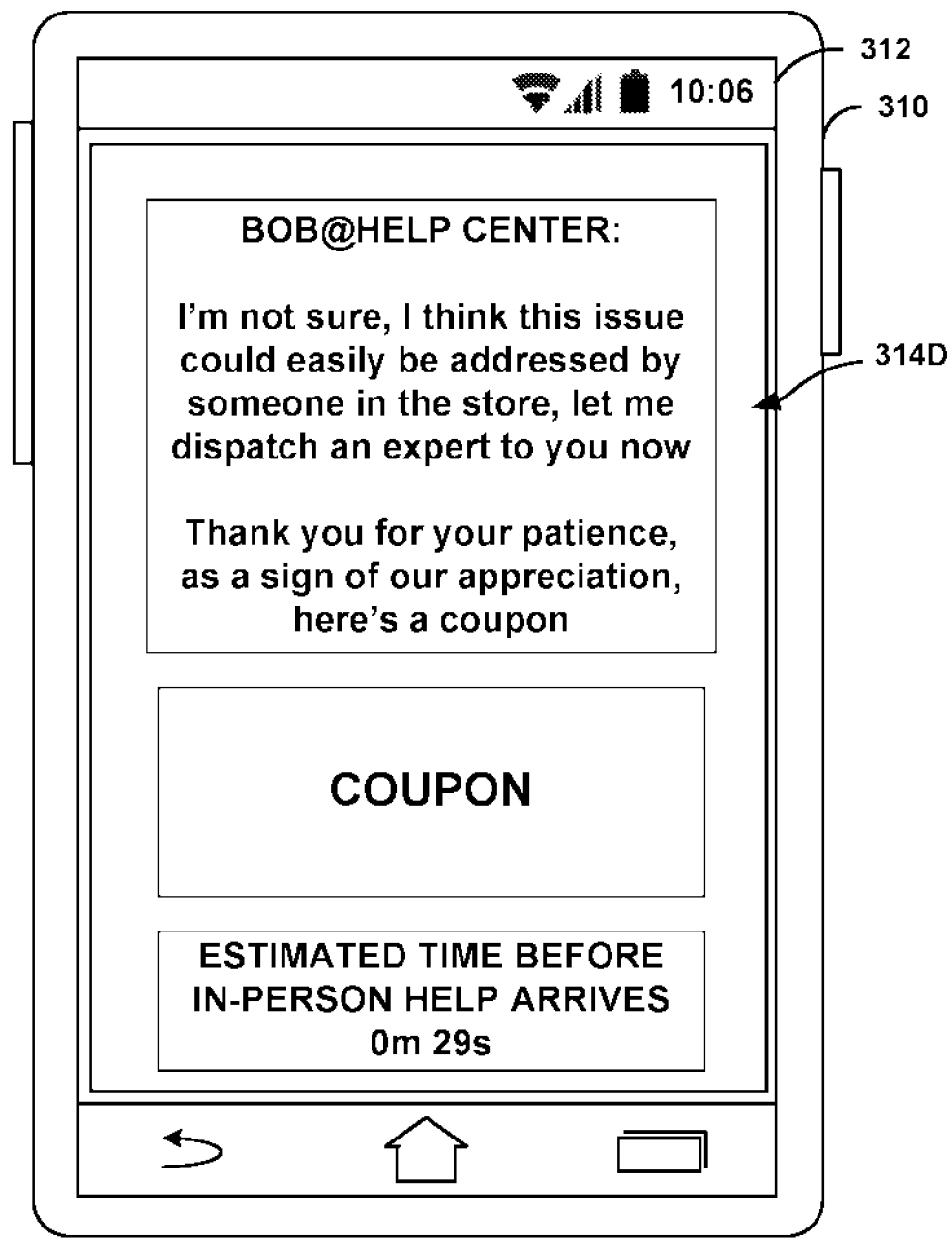

FIG. 3D shows computing device 310 presenting user interface 314D at UID 312 the remote human assistance module is unable to provide the additional information that the user needs to complete the purchase. In the example of FIG. 3D, computing device 310 is automatically dispatching in-person assistance to the physical location associated with the merchant so as to provide product information the user of computing device 310 needs to purchase a product.

FIG. 3D also shows an example where computing device 310 provides customer engagement as part of the customer assistance service offered to the user of computing device 310 when computing device 310 is located at a physical location associated with a merchant. Embedded in user interface 314D is a coupon that computing device provides to the user as a courtesy (e.g., for being unable to answer the questions of the user, if customer service is delayed, etc.). By providing coupons in this way, a merchant, acting through computing device 310 is able to provide quality engagement with a customer.

Figure 4:
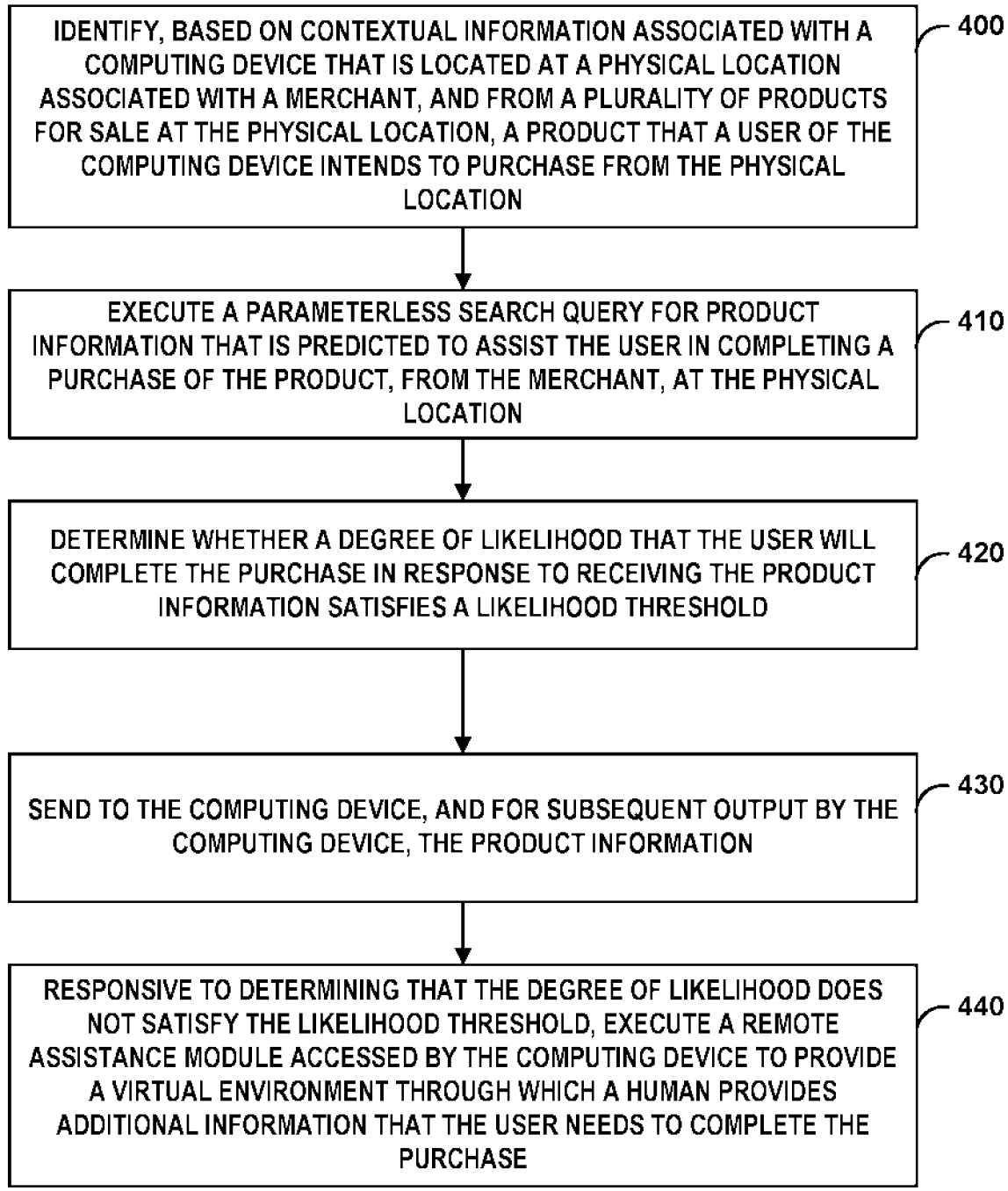
FIG. 4 is a flowchart illustrating example operations performed by an example computing system that is configured to provide customer assistance to a user of a computing device at a physical location, in accordance with one or more aspects of the present disclosure.

FIG. 4 is a flowchart illustrating example operations 400-440 performed by an example computing system, such as ISS 160, which is configured to provide customer assistance to a user of a computing device at a physical location, in accordance with one or more aspects of the present disclosure. FIG. 4 is described below in the context of system 100 of FIG. 1. For example, ISS 160 may perform operations 400-440, in accordance with one or more aspects of the present disclosure.

In the example of FIG. 4, ISS 160 may identify, based on contextual information associated with a computing device that is located at a physical location associated with a merchant, and from a plurality of products for sale at the physical location, a product that a user of the computing device intends to purchase from the physical location (400). For example, ISS 160 may receive a context from context module 122 of computing device 110 indicating that computing device 110 is located in a merchant's store. By determining a product nearest to the location of computing device 110, and/or based on other information about the user of computing device 110, ISS 160 may determine the product that the user is at the merchant's store to purchase.

ISS 160 may execute an autonomous search query for product information that is predicted to assist the user in completing a purchase of the product, from the merchant, at the physical location (410). For example, ISS 160 may use the context of computing device 110, information about the user of computing device 110, and merchant information to form a query for information about a product nearest to computing device 110 and execute a autonomous search for information about the product. ISS 160 may assign a score or degree of likelihood to the product information returned form the autonomous search that indicates whether the user will complete a purchase of the product in response to receiving the product information.

ISS 160 may determine whether a degree of likelihood that the user will complete the purchase in response to receiving the product information satisfies a likelihood threshold (420). For example the likelihood threshold may be seventy percent, fifty percent, ten percent, etc.

ISS 160 may send, to the computing device, and for subsequent output by the computing device, the product information (430). For example, in some examples, ISS 160 may only send the product information if the product information has a degree of likelihood that satisfies the threshold. In other examples, ISS 160 may send the product information regardless of whether the product information satisfies the likelihood threshold. In either case, when ISS 160 sends the product information, ISS 160 may send the product information along with an instruction for formatting the product information as an information card that computing device 110 may automatically surface at UID 112.

Responsive to determining that the degree of likelihood does not satisfy the likelihood threshold, ISS 160 may execute a remote assistance module accessed by the computing device to provide a virtual environment in which a human provides additional information that the user needs to complete the purchase (440). For example, if the product information does not have a degree of likelihood that satisfies the threshold, ISS 160 may escalate the user's need for assistance to a human who is in a remote call center or back room of the merchant's location from which the user can chat to obtain the product information he or she needs to complete a purchase.

Figure 5:
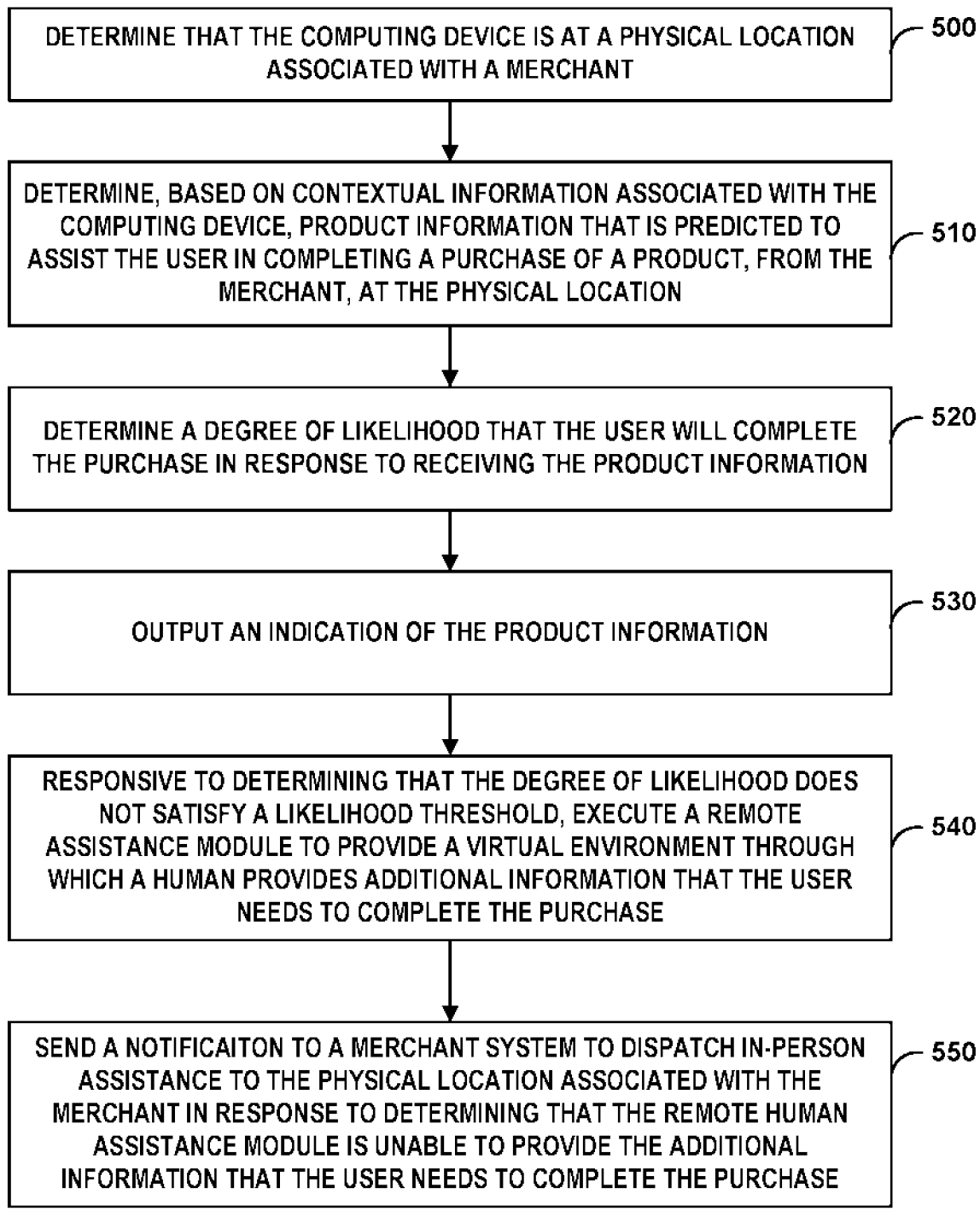
FIG. 5 is a flowchart illustrating example operations performed by an example computing device that is configured to provide customer assistance to a user of the computing device at a physical location, in accordance with one or more aspects of the present disclosure.

FIG. 5 is a flowchart illustrating example operations 500-550 performed by an example computing device, such as computing device 110, which is configured to provide customer assistance to a user of the computing device at a physical location, in accordance with one or more aspects of the present disclosure. FIG. 5 is described below in the context of system 100 of FIG. 1. For example, computing device 110 may perform operations 500-550, in accordance with one or more aspects of the present disclosure.

In the example of FIG. 5, computing device 110 may determine that computing device 110 is at a physical location associated with a merchant (500). For example, computing device 110 may receive contextual information, including beacon information, accelerometer data, wireless communication data, etc., and determine based on the contextual information an aisle, row, bin location, table, etc. within a merchant's store that is nearest to the location of computing device 110.

Computing device 110 may determine, based on the contextual information associated with computing device 110, product information that is predicted to assist a user of computing device 110 in completing a purchase of a product, from the merchant, at the physical location (510). For example, computing device 110 may formulate an autonomous search query for product information associated with a product that computing device 110 is nearest the location of computing device 110. Results from the autonomous search may contain product information.

In some examples, computing device 110 may receive an indication of a user provided query associated with the product. For example, a user may speak or type a question into a user interface presented at UID 112. Computing device 110 may search and determine the product information based at least in part on the user provided query.

Computing device 110 may determine a degree of likelihood that the user will complete the purchase in response to receiving the product information (520). For example, computing device 110 may assign a score or ranking to the product information indicating a how relevant to the product or how likely the information is to assist the user in purchasing the product from the merchant location.

In some examples, if a query was received from the user, computing device 110 may determine the degree of likelihood that the user will complete the purchase in response to receiving the product information based at least in part on whether the product information will satisfy the query. For example, computing device 110 may assign a higher score to the product information if the product information is with a 90% certainty likely to satisfy the query (e.g., answer the question) and may assign a lower score to the product information if the product information only with a 70% certainty likely to satisfy the query (e.g., answer the question).

Computing device 110 may output an indication of the product information (530). For example, in some examples, if the degree of likelihood is high enough to warrant presentation to the user, computing device 110 may cause UID 112 to present the product information (e.g., as graphical user interface 114). For instance, if the product information has a 90% certainty to satisfy a user query, computing device 110 may present the product information. And if the product information only has a 70% certainty of satisfying the user query, computing device 110 may refrain from presenting the product information. In other examples, computing device 110 may cause UID 112 to present the product information automatically without determining whether the degree of likelihood necessarily satisfies a likelihood threshold indicating that the likelihood is high enough to warrant presentation to the user.

As computing device 110 presents product information automatically to the user, the user may provide input to computing device 110 (e.g., by typing or speaking questions to computing device 110). Computing device 110 may continue to try to present product information that answer's the user's questions and has a degree of likelihood that satisfies the likelihood threshold.

Responsive to determining that the degree of likelihood does not satisfy the likelihood threshold, computing device 110 may execute a remote assistance module to provide a virtual environment in which a human provides additional information that the user needs to complete the purchase (540). For example, if computing device 110 determines that the degree of likelihood associated with product information is not high enough to warrant presentation to the user, computing device 110 may escalate assistance for the user by invoking a remote human call center to answer questions and provide product information to the user.

Computing device 110 may send a notification to a merchant system to dispatch in-person assistance to the physical location associated with the merchant in response to determining that the remote human assistance module is unable to provide the additional information that the user needs to complete the purchase (550). For example, computing device 110 may receive information via input from the user or input from the human associated with the remote human assistance module indicating that the user needs an expert to be dispatched to the user's location to provide individual, in-person, customer assistance to the user to help the user complete a purchase of a product from the physical location associated with the merchant. Computing device 110 may send a notification to a dispatching system within the merchant's location such that an expert who is capable of answering questions about the product arrives at the physical location of computing device 110.

In some examples, the techniques of this disclosure may further enable other elements of a customer assistance service not described to this point. For example, as further part of customer engagement, ISS 160 or computing device 110 may determine aisles the user of computing device 110 has visited based on motion of the user and other contextual information obtained from computing device 110. ISS 160 and/or computing device 110 may provide coupons to the user (e.g., displayed at UID 112), if ISS 160 and/or computing device 110 determines the motion or movement of the user indicates he or she has visited enough high profile aisles (e.g., aisles where average worth of items on those aisle far exceed normal purchase average for the user).

Still in other examples, a merchant may fit a shopping cart provided to customers with a device that uses rotation of the cart to power the device (e.g., like a dynamo) and activates a RFID reader in the cart. Assuming all the high cost items in the store are RFID tagged (e.g., for theft detection), ISS 160 may receive information from the cart RFID reader using wireless communication (e.g., Wi-Fi®) when an item is placed in the cart, along with accelerometer data indicating direction of motion of the cart wheels to further determine match to existing user acceleration and pinpoint items that the user has in the cart. Responsive to determining the items in the cart, ISS 160 may provide very targeted coupons and related items to computing device 100. For example, ISS 160 may provide a coupon for HDMI or audio-video cables when ISS 160 determines a television has been placed in the cart.

Clause 1. A method comprising: determining, by a computing device, that the computing device is at a physical location associated with a merchant; determining, by the computing device, based on contextual information associated with the computing device, product information that is predicted to assist a user of the computing device in completing a purchase of a product, from the merchant, at the physical location; determining, by the computing device, a degree of likelihood that the user will complete the purchase in response to receiving the product information; outputting, by the computing device, an indication of the product information; and responsive to determining that the degree of likelihood does not satisfy a likelihood threshold, executing, by the computing device, a remote assistance module to provide a virtual environment in which a human provides additional information that the user needs to complete the purchase.

Clause 2. The method of clause 1, further comprising: sending, by the computing device, to a merchant system, a notification to request in-person assistance at the physical location associated with the merchant in response to determining that the remote human assistance module is unable to provide the additional information that the user needs to complete the purchase.

Clause 3. The method of any of clauses 1-2, receiving, by the computing device, an indication of a user provided query associated with the product, wherein: the product information is further determined based at least in part on the user provided query, and the degree of likelihood that the user will complete the purchase in response to receiving the product information is determined based at least in part on whether the product information will satisfy the query.

Clause 4. The method of any of clauses 1-3, wherein determining that the computing device is at the physical location of the merchant is determined based on at least one of: accelerometer data, wireless communication data, or beacon information; and wherein the method further comprises at least one of: responsive to determining that the beacon information is associated with multiple beacons, prioritizing, by the computing device, the wireless communication data over the beacon information for determining that the computing device is at the physical location; or deprioritizing, by the computing device, the beacon information for determining that future computing devices are at the physical location in response to receiving a user input for dismissing the product information.

Clause 5. The method of any of clauses 1-4, wherein outputting the indication of the product information includes merchant information includes outputting a further indication of merchant information, the merchant information comprising a promotional coupon or advertisement for purchasing the product at the physical location.

Clause 6. The method of any of clauses 1-5, further comprising: determining, by the computing device, a beacon nearest to the physical location of the merchant; and identifying, by the computing device, based at least in part on a search history of the user, and from a plurality of products for sale within a threshold distance of the beacon, the product as being a particular product from the plurality of products.

Clause 7. The method of clause 6, wherein the product is further determined based on at least one of: communication information associated with the user; a purchase history of the user; an electronic shopping list associated with the user; or an electronic shopping list, purchase history, or communication information associated with a family member of the user.

Clause 8. The method of any of clauses 1-7, wherein the product information that is predicted to assist the user in completing the purchase of the product for sale at the physical location is further determined in response to receiving a prior search query associated with the product.

Clause 9. The method of any of clauses 1-8, wherein the product information is determined based at least in part on search results obtained from search queries associated with the product that have been performed at the physical location by other computing devices.

Clause 10. The method of any of clauses 1-9, wherein the virtual environment provided by the remote assistance module comprises at least one of a text-based communication environment, a video-based communication environment, or a voice-based communication environment.

Clause 11. The method of any of clauses 1-10, wherein the degree of likelihood that the user will complete the purchase in response to receiving the product information is determined based at least in part whether other users completed purchases of the product in response to receiving the product information.

Clause 12. The method of any of clauses 1-11, wherein the remote assistance module is further executed in response to receiving a user input for dismissing the product information.

Clause 13. A method comprising: identifying, by a computing system, based on contextual information associated with a computing device that is located at a physical location associated with a merchant, and from a plurality of products for sale at the physical location, a product that a user of the computing device intends to purchase from the physical location; executing, by the computing system, an autonomous search query for product information that is predicted to assist the user in completing a purchase of the product, from the merchant, at the physical location; determining, by the computing system, whether a degree of likelihood that the user will complete the purchase in response to receiving the product information satisfies a likelihood threshold;

sending, by the computing system, to the computing device, and for subsequent output by the computing device, the product information; and responsive to determining that the degree of likelihood does not satisfy the likelihood threshold, executing, by the computing system, a remote assistance module accessed by the computing device to provide a virtual environment in which a human provides additional information that the user needs to complete the purchase.

Clause 14. The method of clause 13, further comprising: sending, by the computing system, to a merchant system, a notification to dispatch in-person assistance to the physical location associated with the merchant in response to determining that the remote human assistance service is unable to provide the additional information that the user needs to complete the purchase.

Clause 15. The method of clause 14, wherein dispatching the in-person assistance to the physical location associated with the merchant comprises sending, by the computing system, to a merchant system, an indication that the user of the computing device requires the in-person assistance and the physical location.

Clause 16. The method of any of clauses 13-15, further comprising: determining, by the computing system, a beacon nearest to the physical location of the merchant; and identifying, by the computing system, based at least in part on a search history of the user, and from a plurality of products for sale within a threshold distance of the beacon, the product as being a particular product from the plurality of products.

Clause 17. The method of any of clauses 13-16, further comprising: adjusting, by the computing system, the degree of likelihood that the user will complete the purchase in response to determining whether users of other computing devices dismissed prior presentations of the product information at the physical location.

Clause 18. A computing device comprising: at least one processor; an input and output device configured to present a user interface associated with the computing device; a context module operable by the at least one processor to: determine that the computing device is at a physical location associated with a merchant; and obtain contextual information associated with the computing device; a user interface module operable by the at least one processor to: receive, based on the contextual information associated with the computing device, product information that is predicted to assist a user of the computing device in completing a purchase of a product, from the merchant, at the physical location, the product information having been assigned a degree of likelihood that the user will complete the purchase in response to receiving the product information; output, via the input and output device, an indication of the product information; and responsive to determining that the degree of likelihood does not satisfy a likelihood threshold, executing a remote assistance module to provide, using the input and output device, a virtual environment in which a human provides additional information that the user needs to complete the purchase.

Clause 19. The computing device of clause 18, wherein the user interface module is further operable by the at least one processor to dispatch in-person assistance to the physical location associated with the merchant in response to determining that the remote human assistance module is unable to provide the additional information that the user needs to complete the purchase.

Clause 20. The computing device of any of clauses 18-19, wherein: the computing device comprises the remote assistance module and the remote assistance module is operable by the at least one processor of the computing device to provide the virtual environment; or a remote computing system comprises the remote assistance module and the user interface module is operable by the at least one processor of the computing device to access the virtual environment as a service provided by the remote assistance module.

Clause 21. A computing device comprising means for performing any of the methods of clauses 1-12.

Clause 22. A computer-readable storage medium comprising instructions that, when executed cause at least one processor of a computing device to perform any of the methods of clauses 1-12.

Clause 23. A computing system comprising means for performing any of the methods of clauses 13-17.

Clause 24. A computer-readable storage medium comprising instructions that, when executed cause at least one processor of a computing system to perform any of the methods of clauses 13-17.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method for automated product identification and presentation, the method implemented by one or more processors and comprising:
    determining, based on sensor data from one or more sensors of a computing device, that the computing device is located at a physical store;
    identifying, from stored information that is based on one or more computing interactions of the user prior to arriving at the physical store, a product of interest to the user;
    determining, based on accessing stored store information associated with the physical store, that the product is available at the physical store; and
    in response to identifying the product based on the one or more computing interactions of the user, determining that the product is available at the physical store, and determining that the computing device is located at the physical store:
        automatically executing, when the computing device is located at the physical store, an autonomous search query, that is based on the product, to identify product information that is responsive to the autonomous search query;
        determining whether a degree of likelihood, that the user will complete a purchase of the product in response to receiving the product information, satisfies a likelihood threshold; and
        responsive to determining that the degree of likelihood satisfies the likelihood threshold:
            causing the computing device to automatically present the product information based on the product information being responsive to the autonomous search query, wherein the product information is predicted to assist a user of the computing device in completing the purchase of the product at the physical store.

2. The method of claim 1, further comprising:
    responsive to determining that the degree of likelihood does not satisfy the likelihood threshold, causing the computing device to execute a remote assistance module that causes the computing device to interface with a remote computing system via which a human interacting with the remote computing system provides additional information related to the product.

3. The method of claim 1, further comprising:
    responsive to determining that the degree of likelihood does not satisfy the likelihood threshold, causing an electronic notification to be transmitted over a network, wherein the electronic notification requests in-person assistance at the physical location.

4. The method of claim 1, wherein the autonomous search query is determined based at least in part on one or more search queries based on the one or more search queries having been performed at the physical store by other computing devices.

5. The method of claim 4, wherein determining the product information is based at least in part on search results obtained in response to one or more of the search queries performed at the physical store by the other computing devices.

6. The method of claim 1,
    wherein determining, based on the sensor data from one or more sensors of a computing device, that the computing device is located at a physical store further comprises:
        determining that the computing device is at a precise location within the physical store; and
    wherein determining, based on accessing stored store information associated with the physical store, that the product is available at the physical store comprises:
        determining that the product is within a threshold distance of the precise location.

7. The method of claim 6, wherein determining that the computing device is at the precise location within the physical store comprises:
    determining, based on at least some of the sensor data, a detected signal strength of a beacon within the physical store; and
    determining the precise location based on the detected signal strength of the beacon.

8. A computing device, comprising:
    an input and output device configured to present a user interface associated with the computing device;
    a plurality of sensors;
    memory storing instructions;
    at least one processor executing the stored instructions to:
        determine, based on sensor data from one or more of the sensors, that the computing device is located at a physical store;
        identify, based on one or more interactions via the computing device prior to arriving at the physical store, a product of interest;
        determine that the product is available at the physical store; and
        in response to identifying the product based on the one or more interactions, determining that the product is available at the physical store, determining that the computing device is located at the physical store:
            automatically execute, when the computing device is located at the physical store, an autonomous search query that is based on the product, to identify product information that is responsive to the autonomous search query;

determine whether a degree of likelihood, that the user will complete a purchase of the product in response to receiving the product information, satisfies a likelihood threshold; and responsive to determining that the degree of likelihood satisfies the likelihood threshold:
  automatically present the product information at the user interface, wherein the product information is presented based on the product information being responsive to the autonomous search query, and wherein the product information is directed to completing a purchase of the product at the physical store.

9. The computing device of claim 8, wherein the at least one processor, in executing the stored instructions, is further to:
  responsive to determining that the degree of likelihood does not satisfy the likelihood threshold:
    execute a remote assistance module that causes the computing device to interface with a remote computing system via which a human interacting with the remote computing system provides additional information related to the product.

10. The computing device of claim 8, wherein the at least one processor, in executing the stored instructions, is further to:
  responsive to determining that the degree of likelihood does not satisfy the likelihood threshold:
    transmit, over a network, an electronic notification that requests in-person assistance at the physical location.

11. The computing device of claim 8, wherein the autonomous search query is determined based at least in part on one or more search based on the one or more search queries having been performed at the physical store by other computing devices.

12. The computing device of claim 11, wherein determining the product information is based at least in part on search results obtained in response to one or more of the search queries performed at the physical store by the other computing devices.

13. The computing device of claim 8,
  wherein in determining, based on the sensor data, that the computing device is located at a physical store, the at least one processor is to:
    determine that the computing device is at a precise location within the physical store; and
  wherein in determining that the product is available at the physical store, the at least one processor is to:
    determine that the product is within a threshold distance of the precise location.

14. The computing device of claim 13, wherein in determining that the computing device is at the precise location within the physical store, the at least one processor is to:
  determine, based on at least some of the sensor data, a detected signal strength of a beacon within the physical store; and
  determine the precise location based on the detected signal strength of the beacon;
  wherein causing the computing device to automatically present the product information is further in response to determining that the degree of likelihood satisfies a likelihood threshold.

\* \* \* \* \*